(12) United States Patent
Tsuji

(10) Patent No.: US 11,371,835 B2
(45) Date of Patent: Jun. 28, 2022

(54) OBJECT DETECTION DEVICE, OBJECT DETECTION SYSTEM, OBJECT DETECTION METHOD, AND NON-TRANSITORY COMPUTER-READABLE MEDIUM STORING PROGRAM

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 16/980,755

(22) PCT Filed: Mar. 16, 2018

(86) PCT No.: PCT/JP2018/010531
§ 371 (c)(1),
(2) Date: Sep. 14, 2020

(87) PCT Pub. No.: WO2019/176096
PCT Pub. Date: Sep. 19, 2019

(65) Prior Publication Data
US 2021/0003391 A1 Jan. 7, 2021

(51) Int. Cl.
*G01B 11/24* (2006.01)
*G01B 11/00* (2006.01)
(52) U.S. Cl.
CPC ............ *G01B 11/24* (2013.01); *G01B 11/005* (2013.01)
(58) Field of Classification Search
CPC ................... G01B 11/24; G01B 11/005; G06T 2207/10016; G06T 2207/30196
See application file for complete search history.

(56) References Cited

U.S. PATENT DOCUMENTS 10,839,573 B2 * 11/2020 Marino .................. G06T 7/536

FOREIGN PATENT DOCUMENTS

| JP | H10-105869 A | 4/1998 | |
| JP | 2000-84495 A | 3/2000 | |
| JP | 2005-156424 A | 6/2005 | |
| JP | 2006-153602 A | 6/2006 | |
| JP | 2017-083371 A | 5/2017 | |
| WO | WO-2009074671 A1 * | 6/2009 | ............. B60Q 1/085 |

OTHER PUBLICATIONS

International Search Report dated Apr. 24, 2018, in corresponding PCT International Application.

* cited by examiner

*Primary Examiner* — Rebecca C Bryant

(57) ABSTRACT

Provided is an object detection device capable of controlling to stop operation of a sensor that detects an object shape when operation of this sensor is not needed. An object detection device (1) includes a feature extraction unit (2) and a sensor activation unit (4). When an object passes an irradiation area of irradiation light from a first sensor configured to detect a feature of a part of a surface of an object by applying irradiation light, the feature extraction unit (2) extracts a feature of the object in the irradiation area. The sensor activation unit (4) activates a second sensor configured to detect an object shape when variation of the extracted feature falls below a predetermined first threshold.

20 Claims, 17 Drawing Sheets

OBJECT DETECTION DEVICE, OBJECT DETECTION SYSTEM, OBJECT DETECTION METHOD, AND NON-TRANSITORY COMPUTER-READABLE MEDIUM STORING PROGRAM

CROSS-REFERENCE TO RELATED PATENT APPLICATIONS

This application is a National Stage Entry of International Application No. PCT/JP2018/010531, filed Mar. 16, 2018. The entire contents of the above-referenced application is expressly incorporated herein by reference.

TECHNICAL FIELD

The present invention relates to an object detection device, an object detection system, an object detection method, and a program, and, particularly, relates to an object detection device, an object detection system, an object detection method, and a program that detect an object by operating a sensor.

BACKGROUND ART

A technique that detects an object by operating a sensor is known. In regard to this technique, Patent Literature 1 discloses a vehicle type determination device which easily detects a high speed vehicle, whose measurement accuracy is not affected by the surrounding environment, and whose installation work is easy. The vehicle type determination device according to Patent Literature 1 includes a projecting means that performs projection scanning of optical beams in the transverse direction of a road, and a light receiving means including a one-dimensional photosensitive array that receives reflected light of the optical beam, and a position information detection means. The position information detection means detects information about a vehicle running on a road from a signal from the light receiving means, and determines the type of the vehicle based on the obtained vehicle information. Patent Literature 1 discloses that a plurality of projecting means and a plurality of light receiving means are placed at intervals in the transverse direction of a road.

Patent Literature 2 discloses a light irradiation device that actively irradiates an object recognized by scanning of infrared laser light with visible light, and discriminates the detected object. The light irradiation device according to Patent Literature 2 includes a first light source unit that emits visible laser light, a second light source unit that emits infrared laser light, a reflected light detection unit that detects reflected light of infrared laser light, an object recognition unit, and an irradiation control unit. The object recognition unit recognizes an object located in an irradiation area of infrared laser light based on the reflected light detected by the reflected light detection unit. The irradiation control unit controls irradiation in such a way that a first irradiation area in a scanning range to be scanned by a scanning mirror unit is irradiated with visible laser light from the first light source unit. Further, the irradiation control unit controls rendering in such a way that a video is rendered in a second irradiation area corresponding to the object recognized by the object recognition unit by the visible laser light from the first light source unit.

CITATION LIST

Patent Literature

PTL1: Japanese Unexamined Patent Application Publication No. H10-105869
PTL2: Japanese Unexamined Patent Application Publication No. 2017-083371

SUMMARY OF INVENTION

Technical Problem

In the technique according to Patent Literature 1, it is necessary to keep the projecting means and the light receiving means in operation at all times. Further, in the technique according to Patent Literature 2, it is necessary to keep the second light source unit that emits infrared laser light and the reflected light detection unit that detects reflected light of the infrared laser light in operation at all times. Keeping a sensor, which detects the shape of an object, in operation can result in an increase in the amount of processing data by the sensor, an increase in power consumption, and so on. Thus, it is desirable to stop the operation of a sensor that detects the shape of an object when this sensor does not need to be in operation.

The present disclosure has been accomplished to solve the above problem, and an object of the present disclosure is to provide an object detection device, an object detection system, an object detection method, and a program capable of controlling to stop the operation of a sensor that detects the shape of an object when this sensor does not need to be in operation.

Solution to Problem

An object detection device according to the present disclosure includes a feature extraction means for extracting a feature of an object in an irradiation area of irradiation light from a first sensor when the object passes the irradiation area, the first sensor being configured to detect a feature of a part of a surface of an object by applying irradiation light, and a sensor activation means for activating a second sensor when variation of the extracted feature falls below a predetermined first threshold, the second sensor being configured to detect an object shape.

An object detection system according to the present disclosure includes a first sensor configured to detect a feature of a part of a surface of an object by applying irradiation light, a second sensor configured to detect an object shape, and an object detection device configured to detect an object, wherein the object detection device includes a feature extraction means for extracting a feature of an object in an irradiation area of the irradiation light from the first sensor when the object passes the irradiation area, and a sensor activation means for activating the second sensor when variation of the extracted feature falls below a predetermined first threshold.

An object detection method according to the present disclosure includes extracting a feature of an object in an irradiation area of irradiation light from a first sensor when the object passes the irradiation area, the first sensor being configured to detect a feature of a part of a surface of an object by applying irradiation light, and activating a second sensor when variation of the extracted feature falls below a predetermined first threshold, the second sensor being configured to detect an object shape.

A program according to the present disclosure causes a computer to perform a step of extracting a feature of an object in an irradiation area of irradiation light from a first sensor when the object passes the irradiation area, the first sensor being configured to detect a feature of a part of a surface of an object by applying irradiation light, and a step of activating a second sensor when variation of the extracted feature falls below a predetermined first threshold, the second sensor being configured to detect an object shape.

Advantageous Effects of Invention

According to the present disclosure, there are provided an object detection device, an object detection system, an object detection method, and a program capable of controlling to stop the operation of a sensor that detects the shape of an object when this sensor does not need to be in operation.

DESCRIPTION OF EMBODIMENTS

Overview of Example Embodiment According to Present Disclosure

Figure 1:
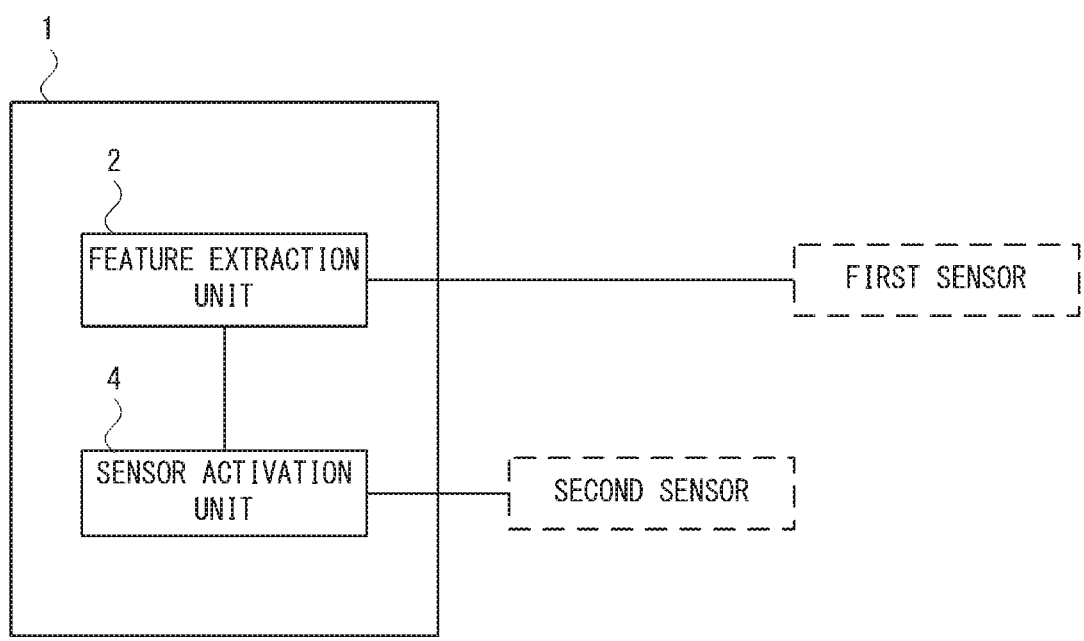
FIG. 1 is a view showing the overview of an object detection device according to an example embodiment of the present disclosure.

Prior to describing example embodiments of the present disclosure, the overview of an example embodiment according to the present disclosure is described. FIG. 1 is a view showing the overview of an object detection device 1 according to an example embodiment of the present disclosure.

The object detection device 1 includes a feature extraction unit 2 that functions as a feature extraction means, and a sensor activation unit 4 that functions as a sensor activation means. The feature extraction unit 2 extracts a feature of an object in an irradiation area of irradiation light from a first sensor, which is configured to detect a feature of a part of the surface of an object by applying irradiation light, when the object passes the irradiation area. The sensor activation unit 4 activates a second sensor, which is configured to detect an object shape, when the variation of the extracted feature falls below a predetermined first threshold.

The object detection device 1 according to this example embodiment has the above-described configuration, and it is thus capable of activating the second sensor that detects an object shape when the second sensor needs to be in operation, i.e., when it is necessary to detect an object shape. Thus, it is capable of controlling to stop the operation of the second sensor when the second sensor does not need to be in operation. This eliminates the need to keep the second sensor operating at all times, which suppresses an increase in the amount of processing data in the second sensor, an increase in power consumption, and so on.

It should be noted that use of an object detection method performed by the object detection device 1 also enables controlling the second sensor to stop operating when the second sensor does not need to be in operation. Further, use of a program capable of implementing the object detection method also enables controlling the second sensor to stop operating when the second sensor does not need to be in operation. Furthermore, use of an object detection system that includes the object detection device 1, the first sensor, and the second sensor also enables controlling the second sensor to stop operating when the second sensor does not need to be in operation.

First Example Embodiment

A first example embodiment is described hereinafter.

Figure 2:
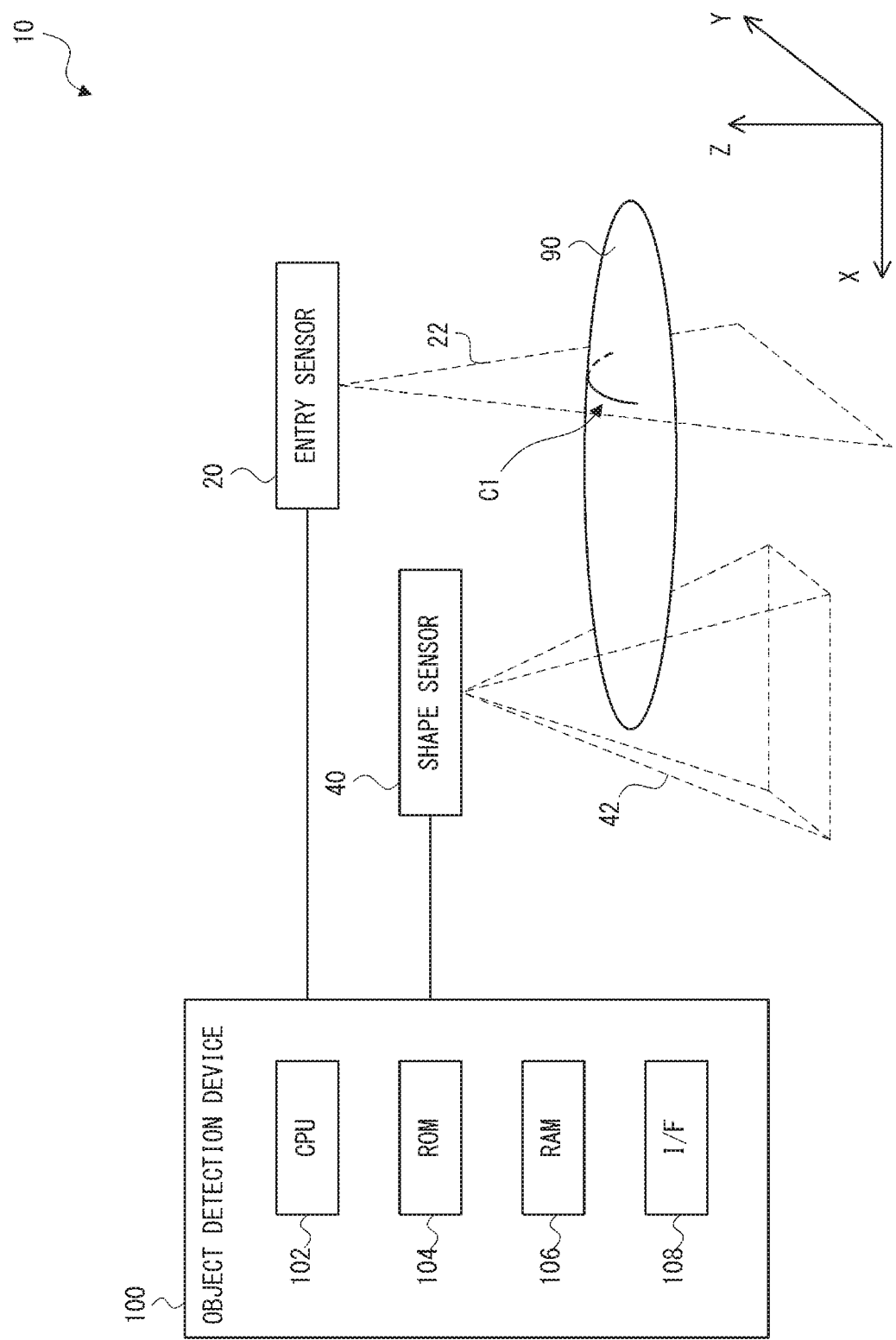
FIG. 2 is a view showing the configuration of an object detection system according to a first example embodiment.

FIG. 2 is a view showing the configuration of an object detection system 10 according to the first example embodiment. The object detection system 10 according to the first example embodiment includes an entry sensor 20, a shape sensor 40, and an object detection device 100. The entry sensor 20 is equivalent of the first sensor shown in FIG. 1. The shape sensor 40 is equivalent of the second sensor shown in FIG. 1. The entry sensor 20 and the shape sensor 40 are three-dimensional sensors such as a depth sensor, a distance sensor, and a 3D camera (stereo camera) capable of measuring the distance to an object. The entry sensor 20 and the shape sensor 40 are LIDAR (Light Detection and Ranging) or the like, for example. Further, the entry sensor 20 and the shape sensor 40 are able to recognize the three-dimensional coordinates in the three-dimensional space where the object detection system 10 is located. Note that the three-dimensional space may be represented by the Cartesian coordinate system or represented by the polar coordinate system. The following description shows an example where the three-dimensional space is represented by the (X, Y, Z) Cartesian coordinate system.

The entry sensor 20 is configured to detect a feature of a part of the surface of an object 90 by applying irradiation light. To be specific, the entry sensor 20 measures the distance from the entry sensor 20 to each point on the object 90. Then, the entry sensor 20 generates distance data indicating the measured distance. The entry sensor 20 generates distance image data indicating a distance image (point cloud) as the distance data. Specifically, the distance data indicates a point group on the surface of the object 90 indicating the distance from the entry sensor 20 in three dimensions.

The entry sensor 20 scans irradiation light such as laser light over a certain range of an irradiation area 22, and receives reflected light of the irradiation light that has been reflected on the object 90. The entry sensor 20 then calculates the distance to the object 90 from a difference between the time of transmission and the time of reception. After that, the entry sensor 20 calculates the three-dimensional coordinates (X, Y, Z) of the reflected position of laser light on the object 90 from the three-dimensional position coordinates of the entry sensor 20, the irradiation direction of laser light, and the distance to the object 90.

The irradiation area 22 of the entry sensor 20 may have a planar shape (or a pyramid shape). In the following description, it is assumed that the irradiation area 22 is formed on a plane perpendicular to the X-axis. In other words, the axis perpendicular to the irradiation area 22 is the X-axis. The vertical direction is the Z-axis, and the axis perpendicular to the X-axis and the Z-axis is the Y-axis. In this manner, the entry sensor 20 forms a laser wall capable of detecting the object 90 that has passed the irradiation area 22 and entered on the side of the shape sensor 40.

The entry sensor 20 detects the three-dimensional coordinates (X, Y, Z) of the position where the surface of the object 90 is irradiated with laser light in the irradiation area 22 when the object 90 passes the irradiation area 22. Thus, a point group corresponding to the positions of the object 90 irradiated by the entry sensor 20 can form a curved line on a plane perpendicular to the X-axis as shown by the arrow C1.

The shape sensor 40 is a Flash LIDAR or the like, for example. The shape sensor 40 is capable of detecting the shape of the object 90 that has passed the irradiation area 22 of the entry sensor 20 by a method similar to that of the entry sensor 20. Specifically, the shape sensor 40 scans irradiation light such as laser light over an irradiation area 42, which is a certain irradiation range, and receives reflected light of the irradiation light that has been reflected on the object 90. The entry sensor 20 then calculates the distance to the object 90 from a difference between the time of transmission and the time of reception. The shape sensor 40 thereby calculates the three-dimensional coordinates (X, Y, Z) of the reflected position of laser light on the object 90. The irradiation area 42 of the shape sensor 40 may have a pyramid shape with the shape sensor 40 at the vertex.

The object detection device 100 is a computer, for example. The object detection device 100 is connected for communication with the entry sensor 20 and the shape sensor 40 by wired or wireless connection. As described later, the object detection device 100 extracts feature data indicating a feature of the object 90 in the irradiation area 22 when the object 90 passes the irradiation area 22 of the entry sensor 20. Then, when the variation of the extracted feature data falls below a predetermined threshold, the object detection device 100 activates the shape sensor 40.

It is assumed that the shape sensor 40 preferably detects the shape of the object 90 when the object 90 stops in the irradiation area 22 of the entry sensor 20 or when the object 90 has completely passed the irradiation area 22 of the entry sensor 20. For example, assume the case where the irradiation area 42 of the shape sensor 40 is on a store shelf, and the object 90 is the arm of a person who extends the arm to the store shelf and grabs a product. In this case, there is a possibility that the hand (from the wrist to the fingertip) does not reach the irradiation area 42 of the shape sensor 40 in the stage of trying to extend the hand to the store shelf. Alternatively, even when the hand (from the wrist to the fingertip) has reached the irradiation area 42 of the shape sensor 40, it is often the case where the hand is not trying to perform the action of grabbing the product or the like. In such a state, detecting the shape of the hand by the shape sensor 40 is not very effective. On the other hand, in the stage of finishing extending the hand to the store shelf, the hand has already reached the irradiation area 42 of the shape sensor 40, and there is a possibility that the hand performs the action of grabbing the product or the like. In such a state, detecting the shape of the hand by the shape sensor 40 is effective.

The object detection device 100 includes, as main hardware components, a CPU (Central Processing Unit) 102, a ROM (Read Only Memory) 104, a RAM (Random Access Memory) 106, and an interface unit 108 (IF; Interface). The CPU 102, the ROM 104, the RAM 106 and the interface unit 108 are connected with each other through a data bus or the like.

The CPU 102 has a function as an arithmetic device that performs control processing, arithmetic processing and so on. The ROM 104 has a function for storing a control program, an arithmetic program and so on to be executed by the CPU 102. The RAM 106 has a function for temporarily storing processing data or the like. The interface unit 108 inputs and outputs signals from and to the outside by wired or wireless connection. Further, the interface unit 108 receives a data input operation by a user and displays information to the user.

Figure 3:
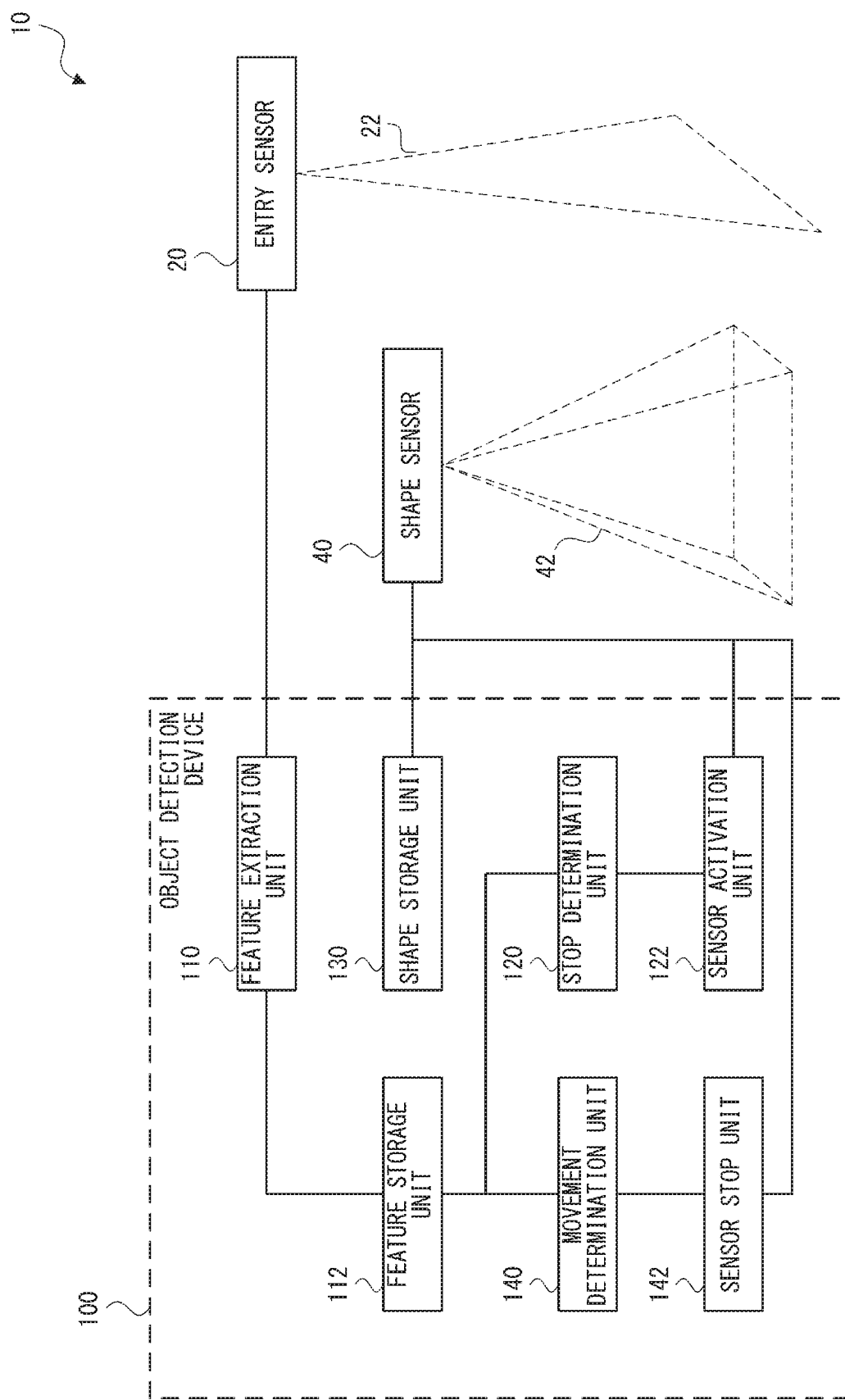
FIG. 3 is a functional block diagram showing the object detection system according to the first example embodiment.

FIG. 3 is a functional block diagram showing the object detection system 10 according to the first example embodiment. The object detection device 100 includes a feature extraction unit 110, a feature storage unit 112, a stop determination unit 120, a sensor activation unit 122, a shape storage unit 130, a movement determination unit 140, and a sensor stop unit 142 (which are referred to hereinafter as "each element"). The feature extraction unit 110, the feature storage unit 112, the stop determination unit 120, and the sensor activation unit 122 function as a feature extraction means, a feature storage means, a stop determination means, and a sensor activation means, respectively. Further, the shape storage unit 130, the movement determination unit 140, and the sensor stop unit 142 function as a shape storage means, a movement determination means, and a sensor stop means, respectively.

Each element can be implemented when the CPU 102 executes a program stored in the ROM 104, for example. Further, a necessary program may be recorded on an arbitrary nonvolatile recording medium and installed according to need. Note that each element is not limited to be implemented by software as described above, and it may be implemented by hardware such as some sort of circuit element. Further, one or more of the above-described elements may be implemented by physically separate hardware. The same applies to other example embodiments described later. Specific functions of each element are described later.

Figure 4:
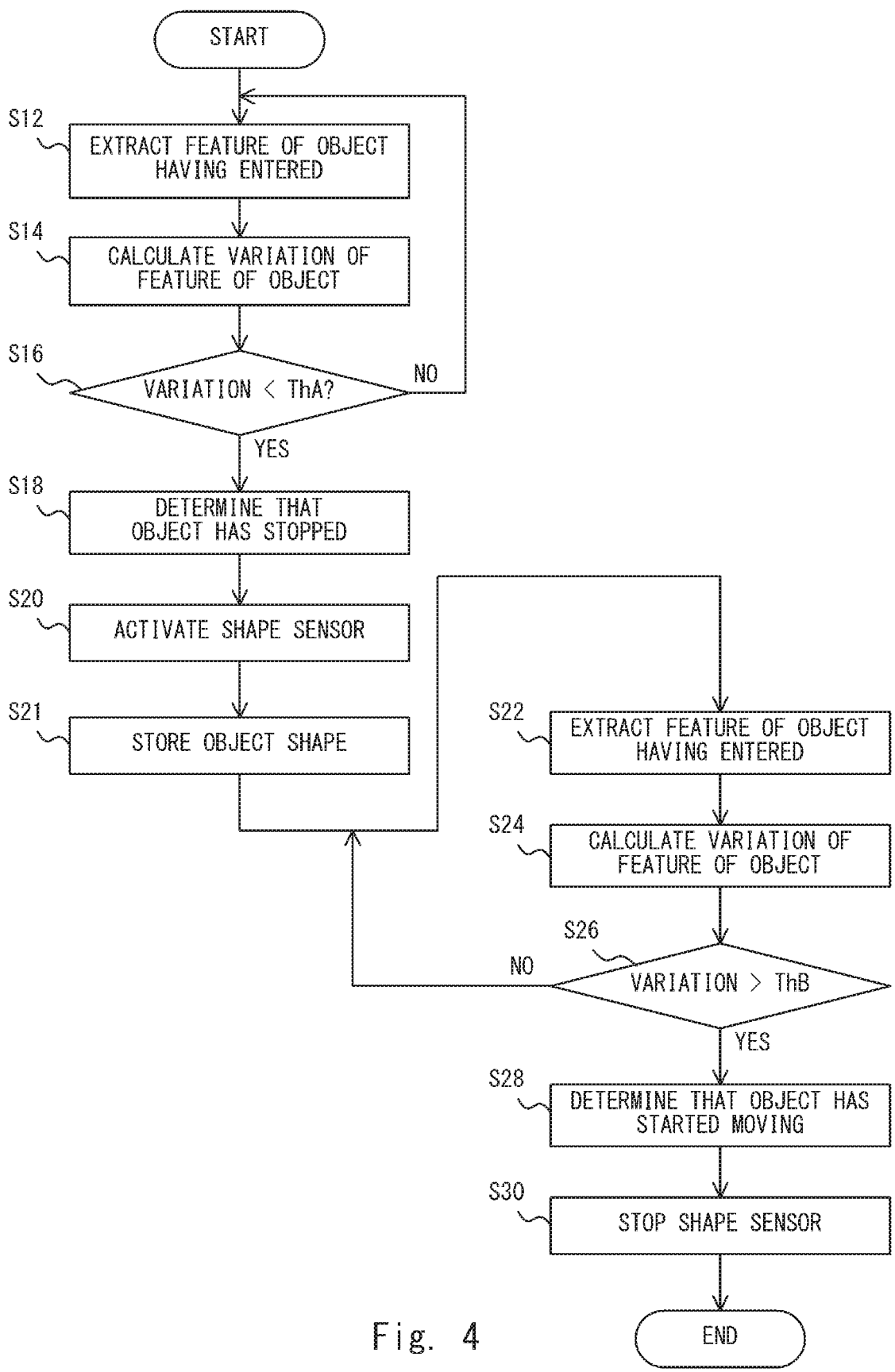
FIG. 4 is a flowchart showing an object detection method performed by an object detection device according to the first example embodiment.

FIG. 4 is a flowchart showing an object detection method performed by the object detection device 100 according to the first example embodiment. The feature extraction unit 110 extracts feature data indicating a feature of the object 90 that has passed the irradiation area 22 of the entry sensor 20 and entered on the side of the shape sensor 40 (Step S12). The "feature data" corresponds to data related to the surface shape of the object 90 which is detected by the entry sensor 20 in the irradiation area 22. Further, the "feature data" relates to position information indicating the three-dimensional shape of the object 90 which is detected by the entry sensor 20. A specific example of the "feature data" is described later. The feature extraction unit 110 may generate the feature data from the position coordinates of each point group acquired by the entry sensor 20.

Further, the feature extraction unit 110 stores the extracted feature data, in association with time when the feature data is extracted, into the feature storage unit 112. Specifically, when "time t1" is associated with certain feature data, this feature data relates to the shape of the position of the object 90 that has been located in the irradiation area 22 at time t1. Note that, when the object 90 is moving, the feature data varies every moment. i.e., in time series. On the other hand, when the object 90 is not moving, i.e., stopping, the feature data does not substantially vary.

For example, when the object 90 is moving from time t1 to time t2, the shape of the object 90 in the irradiation area 22 at time t2 can be different from the shape of the object 90 in the irradiation area 22 at time t1. Thus, in this case, the variation between the feature data at time t1 and the feature data at time t2 can be large. On the other hand, when the object 90 does not substantially move from time t1 to time t2, the shape of the object 90 in the irradiation area 22 at time t2 can be substantially the same as the shape of the object 90 in the irradiation area 22 at time t1. Thus, in this case, the variation between the feature data at time t1 and the feature data at time t2 can be small. Further, when the whole of the object 90 has passed the irradiation area 22, the variation of the feature data can be substantially 0.

The stop determination unit 120 calculates the variation of the feature of the object 90 having passed the irradiation area 22 (Step S14). To be specific, the stop determination unit 120 extracts the feature data associated with time t1 and the feature data associated with time t2, which are consecutive in time series, from the feature storage unit 112. The stop determination unit 120 then calculates a difference (variation) between the feature data associated with time t1 and the feature data associated with time t2. A specific example of a method of calculating the variation of the feature data is described later. The stop determination unit 120 may generate the feature data from the position coordinates of each point group acquired by the entry sensor 20. In this case, the feature storage unit 112 may store the position coordinates in association with time of detection.

After that, the stop determination unit 120 determines whether the variation of the feature data falls below a predetermined threshold ThA or not (Step S16). The threshold ThA may be set to an appropriate value to determine that the object 90 has stopped. When it is determined that the variation is equal to or more than ThA (NO in S16), the process returns to S12. In this case, since the feature data varies, the stop determination unit 120 determines that the object 90 is not stopping.

On the other hand, when it is determined that the variation is less than ThA (YES in S16), the feature data does not vary, and the stop determination unit 120 determines that the object 90 has stopped (Step S18). Then, the stop determination unit 120 outputs a signal (object stop signal) indicating that the object 90 has stopped to the sensor activation unit 122. When the object 90 has completely passed the irradiation area 22, the stop determination unit 120 may determine that the movement of the object 90 in the irradiation area 22 has ended. Note that the stop determination unit 120 can determine that the object 90 has stopped when the variation is small while the object 90 is located in the irradiation area 22.

The sensor activation unit 122 activates the shape sensor 40 when it receives the object stop signal (Step S20). In other words, the sensor activation unit 122 activates the shape sensor 40 when the variation of the feature data falls below the threshold ThA. The shape sensor 40 is thereby activated and starts detecting the shape of the object 90 located in the irradiation area 42. The shape sensor 40 acquires three-dimensional position information indicating the shape of the object 90, and transmits this information to the object detection device 100. The shape storage unit 130 of the object detection device 100 stores the three-dimensional position information and thereby stores the shape of the object 90 (Step S21). Note that this processing in S21 can be performed during the process from S22 to S26, which are described later.

As described above, the object detection device 100 according to the first example embodiment can activate the shape sensor 40 when the variation of the feature data falls below the threshold ThA. i.e., when the variation of the feature data becomes small (or becomes zero). The case where the variation of the feature data becomes small is likely to be when the object 90 has stopped in the irradiation area 22 of the entry sensor 20, or when the object 90 has completely passed the irradiation area 22 of the entry sensor 20. As described earlier, the shape sensor 40 according to this example embodiment preferably detects the shape of the object 90 in such cases.

Thus, the object detection device 100 according to the first example embodiment can activate the shape sensor 40 when it is necessary to detect the shape of the object 90. In other words, the object detection device 100 according to the first example embodiment can stop the operation of the shape sensor 40 when the operation of the shape sensor 40 is not needed. This eliminates the need to keep the shape sensor 40 operating at all times, which suppresses an increase in the amount of processing data in the shape sensor 40 and an increase in power consumption, and so on.

Further, the stop determination unit 120 can determine that the object 90 has stopped. The sensor activation unit 122 can thereby activate the shape sensor 40 when the object 90 has stopped. In the above-described example where the shape sensor 40 is on a store shelf, when the arm stops in the irradiation area 22 of the entry sensor 20, it is likely that this person is about to move the hand to grab a product. Thus, the sensor activation unit 122 can activate the shape sensor 40 at more appropriate timing.

Then, the feature extraction unit 110 extracts the feature data of the object 90 that is passing the irradiation area 22 of the entry sensor 20 in the same manner as in the processing of S12 (Step S22). The feature extraction unit 110 then stores the extracted feature data, in association with time when the feature data is extracted, into the feature storage unit 112.

The movement determination unit 140 calculates the variation of the feature data of the object 90 that is passing the irradiation area 22 in the same manner as in the processing of S14 (Step S24). A method of calculating the variation of the feature data may be similar to the method used in the stop determination unit 120. The movement determination unit 140 may generate the feature data from the position coordinates of each point group acquired by the entry sensor 20. In this case, the feature storage unit 112 may store the position coordinates in association with time of detection.

After that, the movement determination unit 140 determines whether the variation of the feature data exceeds a predetermined threshold ThB (second threshold) or not (Step S26). The threshold ThB may be set to an appropriate value to determine that the object 90 has started moving. Further, ThB may be equal to ThA. When it is determined that the variation is equal to or less than the threshold ThB (NO in S26), the process returns to S21. Since the feature data does not vary, the movement determination unit 140 determines that the object 90 has not started moving. On the other hand, when it is determined that the variation is more than the threshold ThB (YES in S26), the feature data varies, and the movement determination unit 140 determines that the object 90 has started moving (Step S28). Then, the movement determination unit 140 outputs a signal (object movement signal) indicating that the object 90 has started moving to the sensor stop unit 142.

In the processing of S18, when it is determined that the object 90 has completely passed the irradiation area 22, the movement determination unit 140 may determine that the object 90 has started moving at the moment when the object 90 reaches the irradiation area 22. In this case, since the object 90 is not located in the irradiation area 22 when the object 90 has completely passed the irradiation area 22 and the whole of the object 90 is on the side of the shape sensor 40 relative to the irradiation area 22, it is obvious that it is determined that there is no variation of the feature in S26. On the other hand, since the feature significantly varies at the moment when the object 90 reaches the irradiation area 22, it is obvious that the variation exceeds the threshold ThB in the processing of S26.

The sensor stop unit 142 stops the operation of the shape sensor 40 when it receives the object movement signal (Step S30). In other words, the sensor stop unit 142 stops the operation of the shape sensor 40 when the variation of the feature data exceeds the threshold ThB. The operation of the shape sensor 40 thereby stops.

As described above, the object detection device 100 according to the first example embodiment can stop the operation of the shape sensor 40 when the object 90 starts moving after the shape sensor 40 is activated. In the above-described example where the shape sensor 40 is on a store shelf, when the arm starts moving in the irradiation area 22 of the entry sensor 20, it is likely that this person has finished the action of trying to grab a product and is about to pull back the hand. Keeping detecting the shape of the hand (object 90) by the shape sensor 40 in such a situation is not very effective. Thus, the sensor activation unit 122 can stop the operation of the shape sensor 40 at appropriate timing. Therefore, the object detection device 100 according to the first example embodiment can stop the operation of the shape sensor 40 when the operation of the shape sensor 40 is no longer needed. This allows the shape sensor 40 to stop at appropriate timing, which suppresses an increase in the amount of processing data in the shape sensor 40, an increase in power consumption, and so on.

Further, the object detection device 100 according to the first example embodiment activates the shape sensor 40 at appropriate timing and stops the operation of the shape sensor 40 at appropriate timing. The shape sensor 40 thereby detects a change in the shape of the object 90 more appropriately. This allows the shape sensor 40 to be activated when the shape of the object 90 can change, and allows the shape sensor 40 to stop operation when a change in the shape of the object 90 can end. Therefore, the object detection device 100 according to the first example embodiment is capable of storing data indicating the state where the shape of the object 90 has changed in a more appropriate way and without waste.

Further, the object detection device 100 according to the first example embodiment can stop the operation of the shape sensor 40 when the variation of the feature data exceeds the threshold ThB, i.e., when the variation of the feature data becomes large (or the variation occurs). The case where the variation of the feature data becomes large is likely to be when the object 90 has started moving in the irradiation area 22 of the entry sensor 20. In this configuration, the operation of the shape sensor 40 can be stopped by using the feature data that has been extracted for the activation of the shape sensor 40. This enables simplifying the configuration of the object detection device 100.

Further, the entry sensor 20 according to the first example embodiment is a three-dimensional sensor. A feature of the object 90 mainly appears in the shape of the object 90. The object detection device 100 according to the first example embodiment is capable of extracting a shape representing a feature of the object 90 more appropriately by detecting the position coordinates of the object 90 with use of the three-dimensional sensor.

(Example of Feature Data and Variation)

Specific examples of the feature data of the object 90 and its variation are described hereinafter. First to fifth examples are described below. In the following description, it is assumed that the object 90 is the hand of a person. Note that, although the processing of the stop determination unit 120 is described below, the same applies to the processing of the movement determination unit 140.

Figure 5:
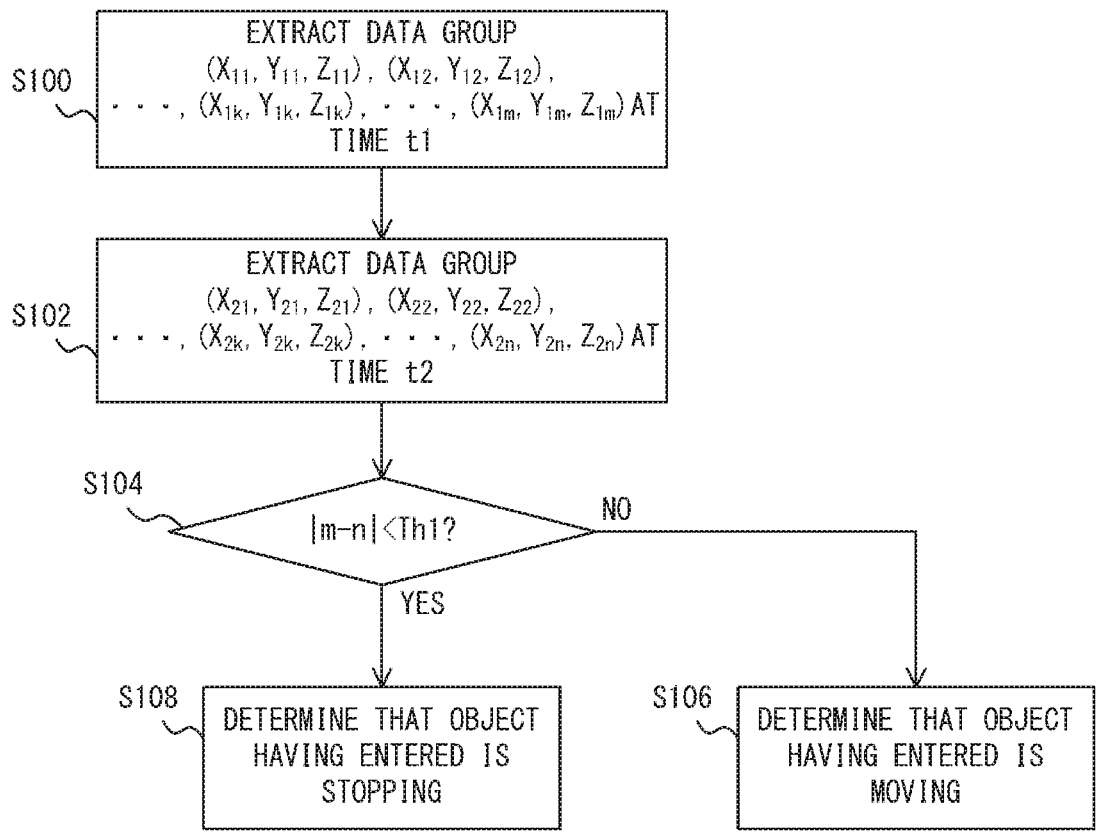
FIG. 5 is a flowchart showing a method of determining whether an object has stopped in a first example.
Figure 6:
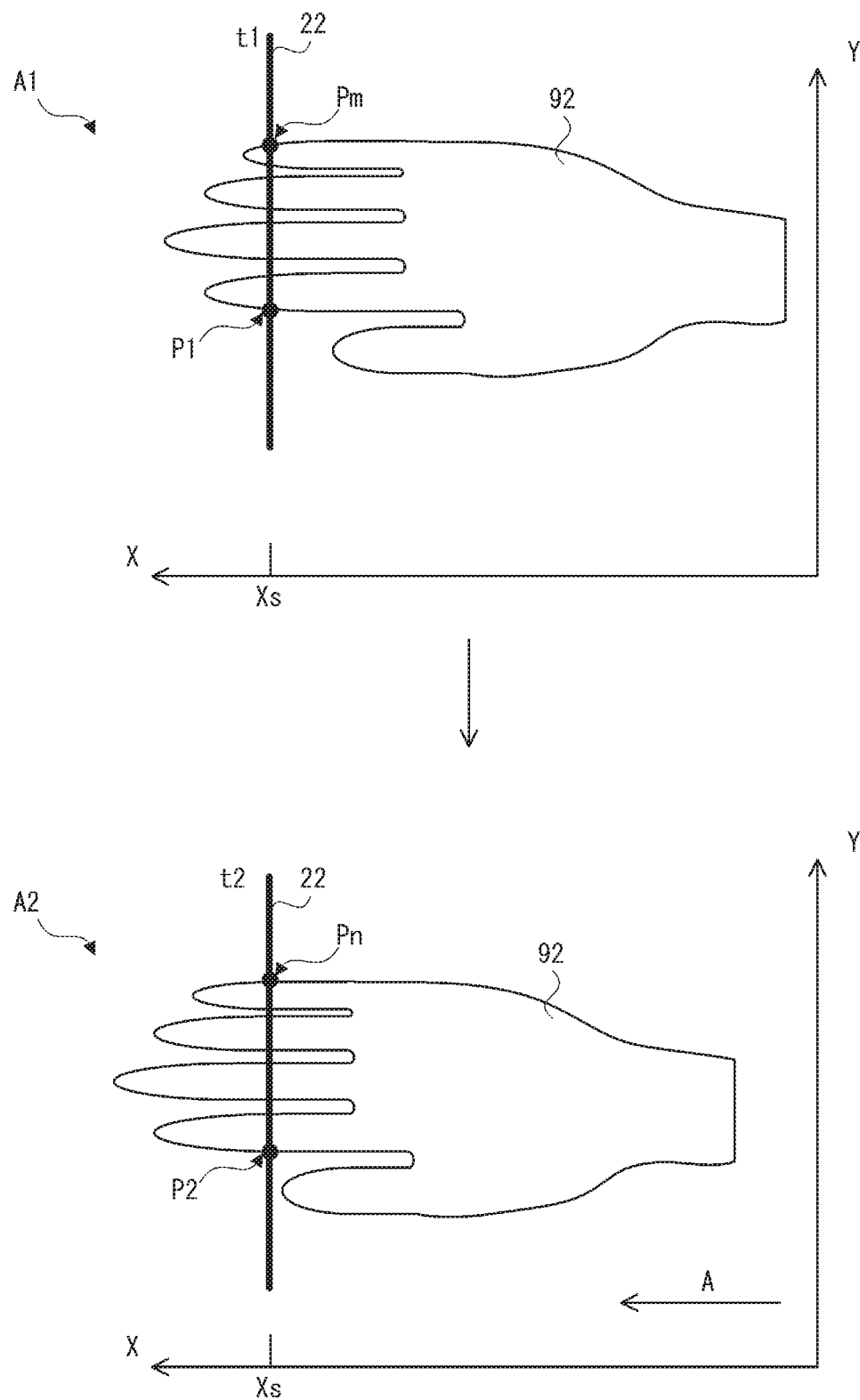
FIG. 6 is a view illustrating the first example.

FIG. 5 is a flowchart showing a method of determining whether the object 90 has stopped in the first example. FIG. 6 is a view illustrating the first example. In the first example, the feature data corresponds to the number of data indicating each position of the object 90 in the irradiation area 22. The feature extraction unit 110 extracts a data group $(X_{11}, Y_{11}, Z_{11})$, $(X_{12}, Y_{12}, Z_{12})$, ..., $(X_{1k}, Y_{1k}, Z_{1k})$, ..., and $(X_{1m}, Y_{1m}, Z_{1m})$ acquired by scanning of laser light by the entry sensor 20 at time t1 (Step S100).

Next, the feature extraction unit 110 extracts a data group $(X_{21}, Y_{21}, Z_{21})$, $(X_{22}, Y_{22}, Z_{22})$, ..., $(X_{2k}, Y_{2k}, Z_{2k})$, ..., and $(X_{2n}, Y_{2n}, Z_{2n})$ acquired by scanning of laser light by the entry sensor 20 at time t2 (t2>t1) (Step S102). The first index in each coordinate corresponds to time when the data is extracted. The second index k in each coordinate corresponds to the order of scanning of laser light when each data is acquired. Stated differently, the second index k in each coordinate corresponds to the order of acquisition of data. Further, m indicates the number of data acquired at time t1, and n indicates the number of data acquired at time 2.

As shown by the arrow A1 in FIG. 6, it is assumed that the entry sensor 20 scans laser light in the positive direction of the Y-axis at the position of X=Xs at time t1. In this case, $(X_{11}, Y_{11}, Z_{11})$ corresponds to a position P1 where the value of the Y-coordinate is the smallest among the positions where a hand 92 and the irradiation area 22 intersect. Further, $(X_{1m}, Y_{1m}, Z_{1m})$ corresponds to a position Pm where the value of the Y-coordinate is the greatest among the positions where the hand 92 and the irradiation area 22 intersect.

As shown by the arrow A2 in FIG. 6, when the hand 92 moves as indicated by the arrow A, the entry sensor 20 scans laser light in the positive direction of the Y-axis at the position of X=Xs at time t2. In this case, $(X_{21}, Y_{21}, Z_{21})$ corresponds to a position P2 where the value of the Y coordinate is the smallest among the positions where the hand 92 and the irradiation area 22 intersect. Further, ($X_{2n}$, $Y_{2n}$, $Z_{2n}$) corresponds to a position Pn where the value of the Y coordinate is the greatest among the positions where the hand 92 and the irradiation area 22 intersect.

The stop determination unit 120 determines whether a difference between the number of data acquired at time t1 and the number of data acquired at time t2 is less than a predetermined threshold Th1 or not (Step S104). Specifically, the stop determination unit 120 determines whether |m−n|<Th1 is satisfied or not. Th1 corresponds to ThA shown in FIG. 4. When it is determined that |m−n|≥Th1 is satisfied, i.e., a difference between the number of data at time t1 and the number of data at time t2 is equal to or more than the threshold Th1 (NO in S104), the stop determination unit 120 determines that the object 90 that has entered the irradiation area 22 is moving (Step S106). On the other hand, when it is determined that |m−n|<Th1 is satisfied, i.e., a difference between the number of data at time t1 and the number of data at time t2 is less than the threshold Th1 (YES in S104), the stop determination unit 120 determines that the object 90 that has entered the irradiation area 22 is stopping (Step S108).

The surface shape of the hand 92 is irregular. Thus, when the hand 92 moves across the irradiation area 22 from time t1 to time t2, the number m of data acquired at time t1 and the number n of data acquired at time t2 can be different from each other. It is therefore possible to determine whether the object 90 has stopped or not by using a difference between the number m of data acquired at time t1 and the number n of data acquired at time 2.

In the first example, a difference between the number of data acquired at time t1 and the number of data acquired at time t2 is the variation of the feature of the object 90. Note that the number of data is easily and immediately determined. Thus, the method according to the first example enables easy and immediate calculation of the variation of the feature of the object 90.

Figure 7:
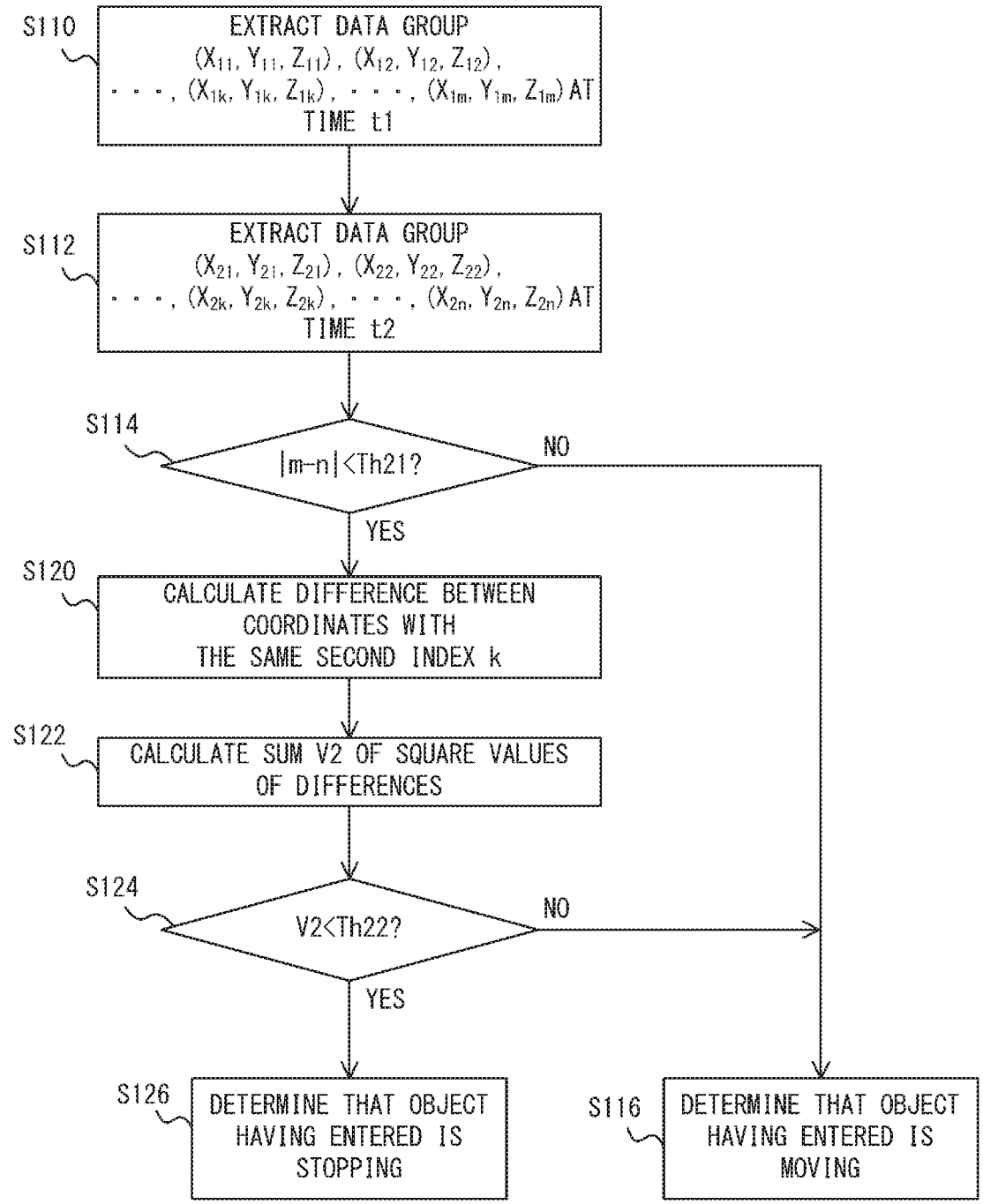
FIG. 7 is a flowchart showing a method of determining whether an object has stopped in a second example.

FIG. 7 is a flowchart showing a method of determining whether the object 90 has stopped in the second example. In the second example, the feature data corresponds to coordinate data indicating each position on the object 90 in the irradiation area 22. The feature extraction unit 110 extracts a data group ($X_{11}$, $Y_{11}$, $Z_{11}$), ($X_{12}$, $Y_{12}$, $Z_{12}$), ..., ($X_{1k}$, $Y_{1k}$, $Z_{1k}$), ..., and ($X_{1m}$, $Y_{1m}$, $Z_{1m}$) at time t1 in the same manner as in the processing of S100 (Step S110). Next, the feature extraction unit 110 extracts a data group ($X_{21}$, $Y_{21}$, $Z_{21}$), ($X_{22}$, $Y_{22}$, $Z_{22}$), ..., ($X_{2k}$, $Y_{2k}$, $Z_{2k}$), ..., and ($X_{2n}$, $Y_{2n}$, $Z_{2n}$) at time t2 in the same manner as in the processing of S102 (t2>t1) (Step S112).

The stop determination unit 120 determines whether a difference between the number of data acquired at time t1 and the number of data acquired at time t2 is less than a predetermined threshold Th21 or not in the same manner as in the processing of S104 (Step S114). Th21 corresponds to Th1 shown in FIG. 5. When it is determined that a difference between the number of data at time t1 and the number of data at time t2 is equal to or more than the threshold Th21 (NO in S114), the stop determination unit 120 determines that the object 90 that has entered the irradiation area 22 is moving (Step S116).

On the other hand, when it is determined that a difference between the number of data at time t1 and the number of data at time t2 is less than the threshold Th21 (YES in S114), the stop determination unit 120 calculates a difference between the coordinates with the same second index k at time t1 and time t2 (Step S120). For example, the stop determination unit 120 calculates |$X_{1k}$−$X_{2k}$|, |$Y_{1k}$−$Y_{2k}$|, AND |$Z_{1k}$−$Z_{2k}$|. SPECIFICALLY, THE STOP DETERMINATION UNIT 120 calculates each of |$X_{11}$−$X_{21}$|, |$Y_{11}$−$Y_{21}$|, |$Z_{11}$−$Z_{21}$|, ..., ..., |$X_{1m}$−$X_{2m}$|, |$Y_{1m}$−$Y_{2m}$|, and |$Z_{1m}$−$Z_{2m}$|. Note that m≤n. Alternatively, the stop determination unit 120 may calculate $\sqrt{\{|X_{1k}-X_{2k}|^2+|Y_{1k}-Y_{2k}|^2+|Z_{1k}-Z_{2k}|^2\}}$. Specifically, the stop determination unit 120 may calculate each of $\sqrt{\{|X_{11}-X_{21}|^2+|Y_{11}-Y_{21}|^2+|Z_{11}-Z_{21}|^2\}}$, ..., and $\sqrt{\{|X_{1m}-X_{2m}|^2+|Y_{1m}-Y_{2m}|^2+|Z_{1m}-Z_{2m}|^2\}}$.

The stop determination unit 120 calculates the sum V2 of the square values of differences calculated in the processing of S120 (Step S122). For example, the stop determination unit 120 calculates V2 by the following Equation 1:

$$V2 = \sum_{k=1}^{m} \{|x_{1k} - x_{2k}|^2 + |y_{1k} - y_{2k}|^2 + |z_{1k} - z_{2k}|^2\}$$

Specifically, the stop determination unit 120 calculates V2=|$X_{11}$−$X_{21}$|²+|$Y_{11}$−$Y_{21}$|²+|$Z_{11}$−$Z_{21}$|²+ . . . +|$X_{1m}$−$X_{2m}$|²+|$Y_{1m}$−$Y_{2m}$|²+|$Z_{1m}$−$Z_{2m}$|².

The stop determination unit 120 determines whether the sum V2 of the square values of differences is less than a predetermined threshold Th22 or not (Step S124). Specifically, the stop determination unit 120 determines whether V2<Th22 is satisfied or not. Th22 corresponds to ThA shown in FIG. 4. When it is determined that V2≥Th22 is satisfied, i.e., V2 is equal to or more than the threshold Th22 (NO in S124), the stop determination unit 120 determines that the object 90 that has entered the irradiation area 22 is moving (Step S116). On the other hand, when it is determined that V2<Th22 is satisfied, i.e., V2 is less than the threshold Th22 (YES in S124), the stop determination unit 120 determines that the object 90 that has entered the irradiation area 22 is stopping (Step S126).

The surface shape of the hand 92 is irregular. Thus, when the hand 92 moves across the irradiation area 22 from time t1 to time t2, the coordinate data acquired at time t1 and the coordinate data acquired at time t2 can be different from each other. It is therefore possible to determine whether the object 90 has stopped or not by using a difference between the coordinate data acquired at time t1 and the coordinate data acquired at time t2.

In the second example, a difference between the coordinate data acquired at time t1 and the coordinate data acquired at time t2 is the variation of the feature of the object 90. It is relatively easy to acquire the coordinate data in time series and calculate a difference (variation) in the coordinate data that are consecutive in time series. Thus, the method according to the second example enables easy calculation of the variation of the feature of the object 90.

Figure 8:
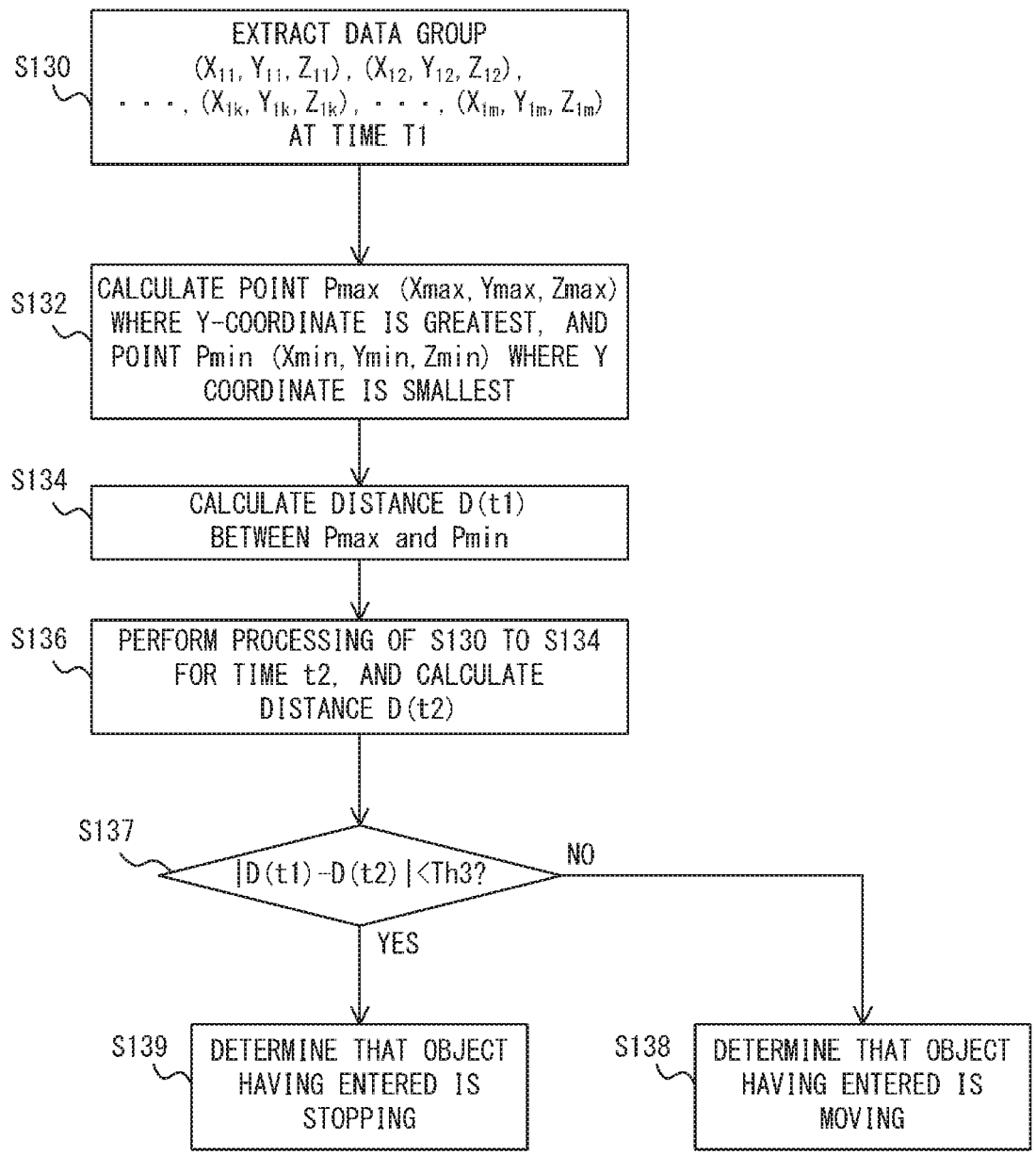
FIG. 8 is a flowchart showing a method of determining whether an object has stopped in a third example.
Figure 9:
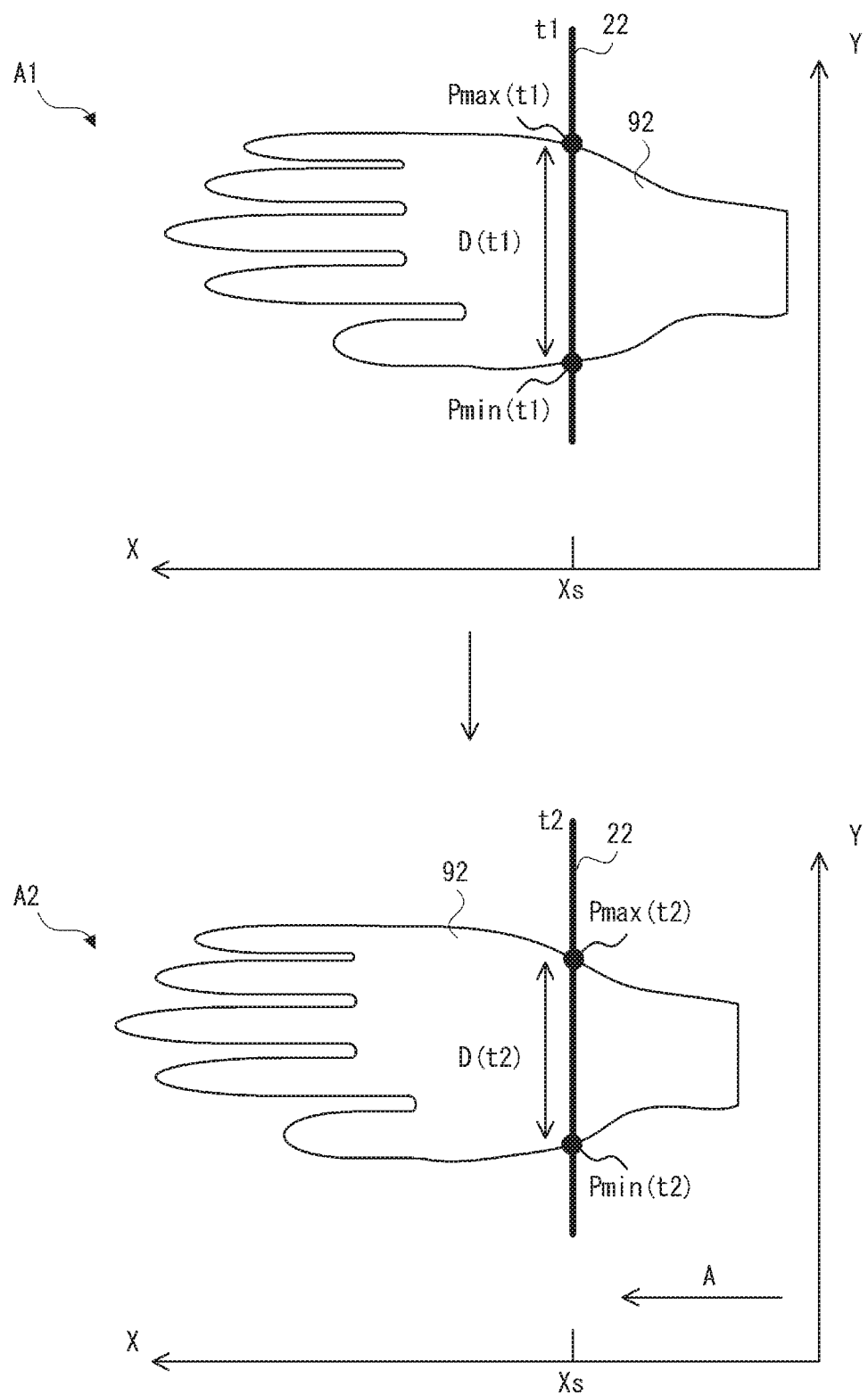
FIG. 9 is a view illustrating the third example.

FIG. 8 is a flowchart showing a method of determining whether the object 90 has stopped in the third example. FIG. 9 is a view illustrating the third example. In the third example, the feature data corresponds to the size of the object 90 in the irradiation area 22. The feature extraction unit 110 extracts a data group ($X_{11}$, $Y_{11}$, $Z_{11}$), ($X_{12}$, $Y_{12}$, $Z_{12}$), ..., ($X_{1k}$, $Y_{1k}$, $Z_{1k}$), ..., and ($X_{1m}$, $Y_{1m}$, $Z_{1m}$) at time t1 in the same manner as in the processing of S100 (Step S130).

The stop determination unit 120 calculates a coordinate Pmax (Xmax, Ymax, Zmax) of a point where the Y-coordinate is the greatest, and a coordinate Pmin (Xmin, Ymin, Zmin) of a point where the Y coordinate is the smallest among the extracted data (Step S132). As shown by the arrow A1 in FIG. 9, the entry sensor 20 scans laser light in the positive direction of the Y-axis at the position of X=Xs at time t1. In this case, $(X_{11}, Y_{11}, Z_{11})$ corresponds to a position Pmim(t1) where the value of the Y-coordinate is the smallest among the positions where the hand 92 and the irradiation area 22 intersect. Further, $(X_{1m}, Y_{1m}, Z_{1m})$ corresponds to a position Pmax(t1) where the value of the Y-coordinate is the greatest among the positions where the hand 92 and the irradiation area 22 intersect.

The stop determination unit 120 calculates a distance D(t1) between Pmax and Pmin (Step S134). To be specific, the stop determination unit 120 calculates the distance D(t1) by calculating $D=\sqrt{\{(Xmax-Xmin)^2+(Ymax-Ymin)^2+(Zmax-Zmin)^2\}}$. This distance D corresponds to the size of the object 90 in the irradiation area 22.

Then, the same processing as in S130 to S134 is performed for time t2, and a distance D(t2) is calculated (Step S136). To be specific, the feature extraction unit 110 extracts a data group $(X_{21}, Y_{21}, Z_{21}), (X_{22}, Y_{22}, Z_{22}), \ldots, (X_{2k}, Y_{2k}, Z_{2k}), \ldots,$ and $(X_{2n}, Y_{2n}, Z_{2n})$ at time t2. The stop determination unit 120 calculates a coordinate Pmax (Xmax, Ymax, Zmax) of a point where the Y-coordinate is the greatest, and a coordinate Pmin (Xmin, Ymin, Zmin) of a point where the Y coordinate is the smallest among the extracted data.

As shown by the arrow A2 in FIG. 9, when the hand 92 moves as indicated by the arrow A, the entry sensor 20 scans laser light in the positive direction of the Y-axis at the position of X=Xs at time 2. In this case, $(X_{21}, Y_{21}, Z_{21})$ corresponds to a position Pmim(t2) where the value of the Y-coordinate is the smallest among the positions where the hand 92 and the irradiation area 22 intersect. Further, $(X_{2n}, Y_{2n}, Z_{2n})$ corresponds to a position Pmax(t2) where the value of the Y-coordinate is the greatest among the positions where the hand 92 and the irradiation area 22 intersect. Further, the stop determination unit 120 calculates a distance D(t2) between Pmax and Pmin in the same manner as in the case of t1.

After that, the stop determination unit 120 determines whether a difference between the distance D(t1) at time t1 and the distance D(t2) at time t2 is less than a predetermined threshold Th3 or not (Step S137). Specifically, the stop determination unit 120 determines whether |D(t1)−D(t2)|<Th3 is satisfied or not. Th3 corresponds to ThA shown in FIG. 4. When it is determined that |D(t1)−D(t2)|≥Th3 is satisfied (NO in S137), the stop determination unit 120 determines that the object 90 that has entered the irradiation area 22 is moving (Step S138). Thus, the stop determination unit 120 determines that the object 90 that has entered the irradiation area 22 is moving when a difference between the distance D(t1) at time t1 and the distance D(t2) at time t2 is equal to or more than the threshold Th3. On the other hand, when it is determined that |D(t1)−D(t2)|<Th3 is satisfied (YES in S137), the stop determination unit 120 determines that the object 90 that has entered the irradiation area 22 is stopping (Step S139). Thus, the stop determination unit 120 determines that the object 90 that has entered the irradiation area 22 is stopping when a difference between the distance D(t1) at time t1 and the distance D(t2) at time t2 is less than the threshold Th3.

The surface shape of the hand 92 is irregular, and its width is not uniform. Thus, when the hand 92 moves across the irradiation area 22 from time t1 to time t2, the size (distance D(t1)) of the hand 92 in the irradiation area 22 at time t1 and the size (distance D(t2)) of the hand 92 in the irradiation area 22 at time t2 can be different from each other. It is therefore possible to determine whether the object 90 has stopped or not by using a difference between the size in the irradiation area 22 at time t1 and the size in the irradiation area 22 at time t2. Note that the distance D may be normalized when calculating a difference in the distance D.

In the third example, a difference between the size of the object 90 in the irradiation area 22 at time t1 and the size of the object 90 in the irradiation area 22 at time t2 is the variation of the feature of the object 90. It is relatively easy to acquire the coordinate data in time series, calculate the sizes of the object 90, and calculate a difference (variation) in the size of the object 90 that are consecutive in time series. Thus, the method according to the third example enables easy calculation of the variation of the feature of the object 90.

Figure 10:
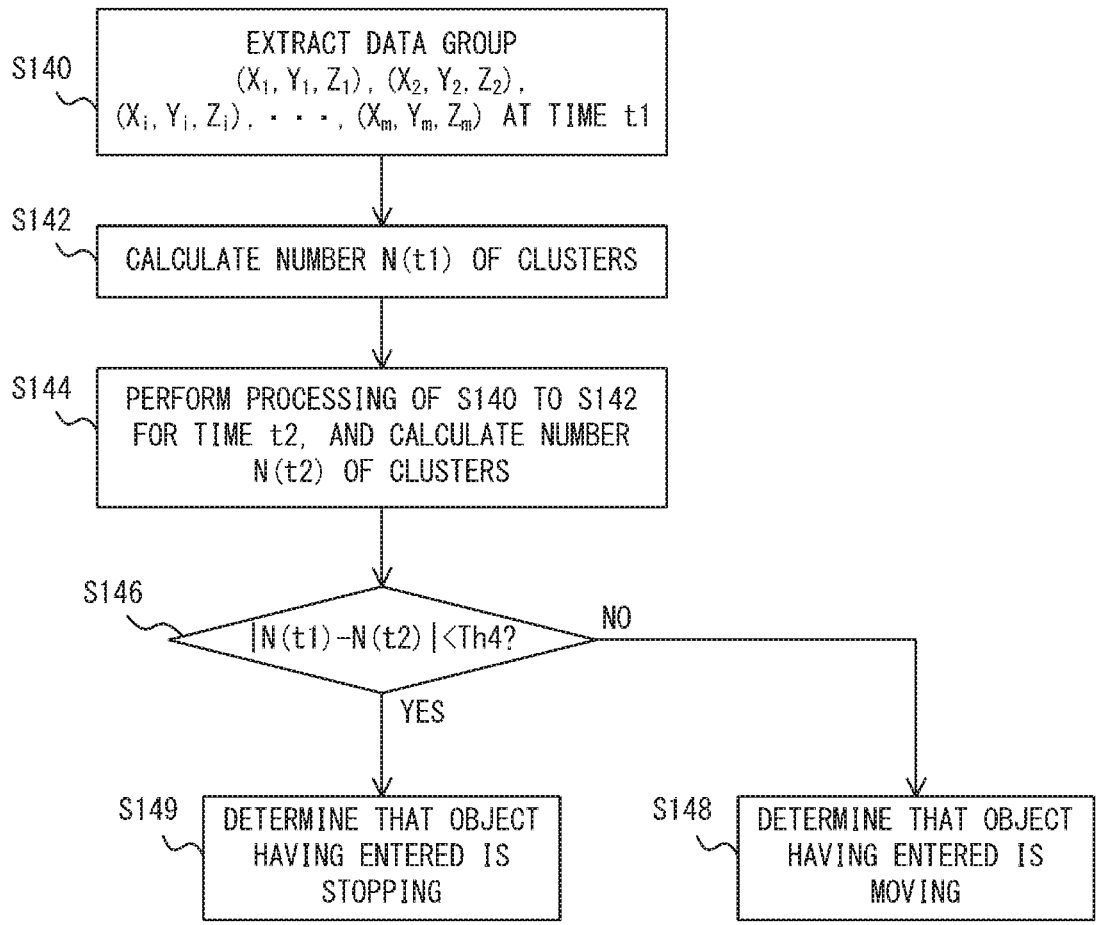
FIG. 10 is a flowchart showing a method of determining whether an object has stopped in a fourth example.
Figure 11:
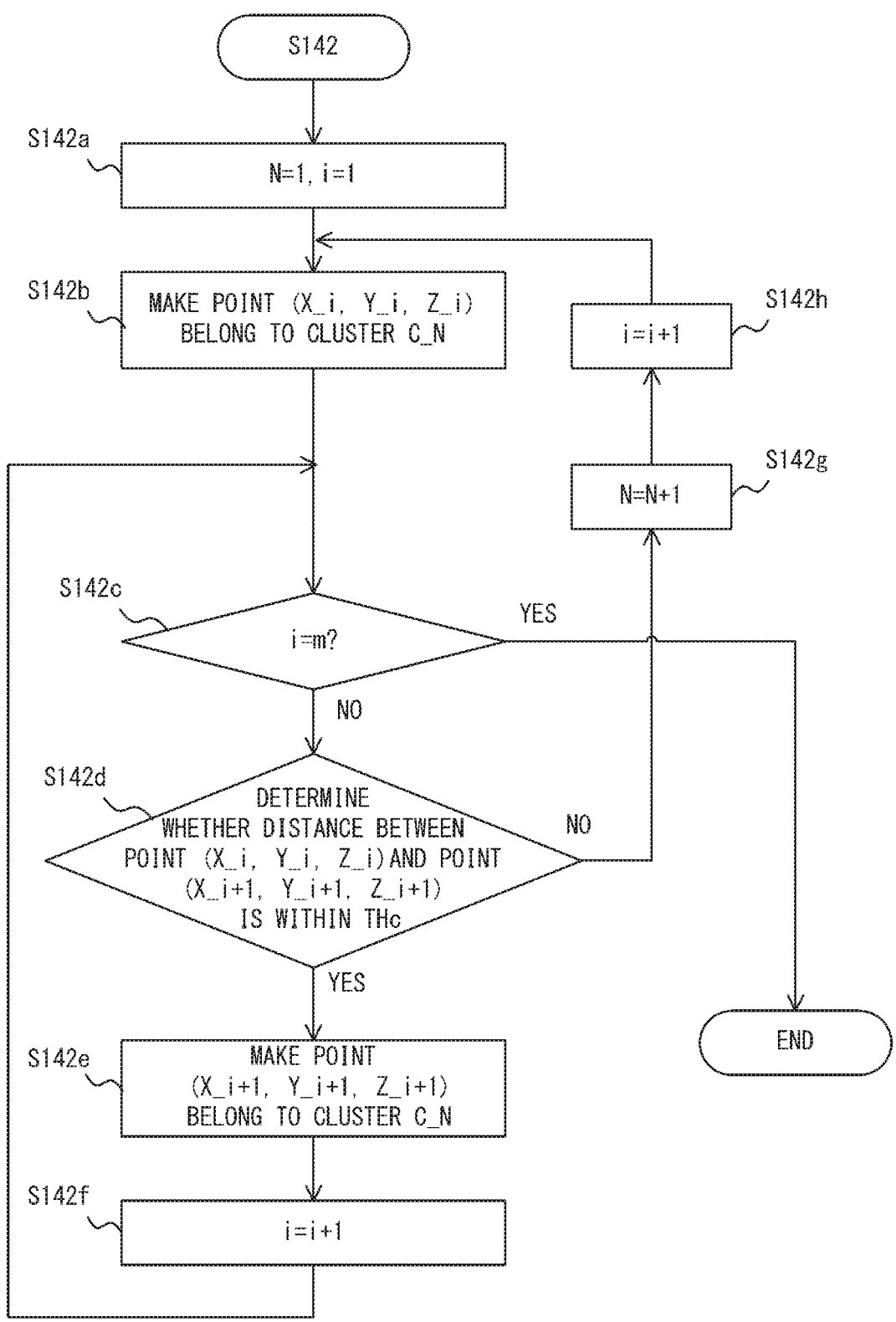
FIG. 11 is a flowchart showing a method of determining whether an object has stopped in the fourth example.
Figure 12:
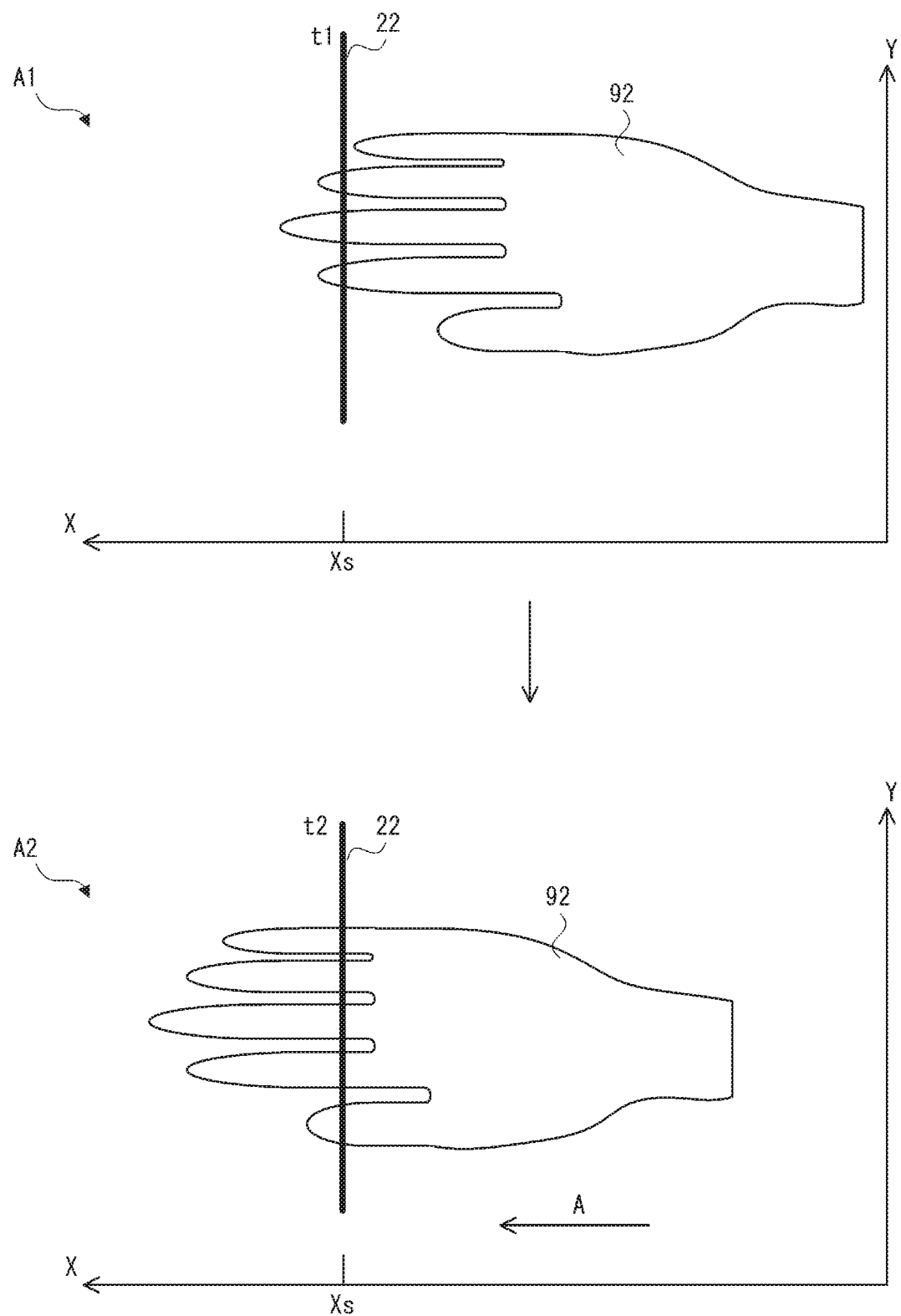
FIG. 12 is a view illustrating the fourth example.

FIGS. 10 and 11 are flowcharts showing a method of determining whether the object 90 has stopped in the fourth example. FIG. 12 is a view illustrating the fourth example. In the fourth example, the feature data corresponds to the number of groups (clusters) of data indicating the object 90 in the irradiation area 22. The feature extraction unit 110 extracts a data group $(X_1, Y_1, Z_1), (X_2, Y_2, Z_2), \ldots, (X_i, Y_i, Z_i), \ldots,$ and $(X_m, Y_m, Z_m)$ at time t1 in the same manner as in the processing of S100 (Step S140).

The stop determination unit 120 calculates the number N(t1) of groups (clusters) of each data at time t1 (Step S142). To be specific, the stop determination unit 120 calculates the number N of clusters by treating a collection of data (points) where the distance between adjacent data is within a predetermined distance threshold THc as one cluster.

FIG. 11 is a flowchart showing an example of a method of calculating the number of clusters. The stop determination unit 120 initializes the number N of clusters and the data number to N=1 and i=1, respectively (Step S142a). Next, the stop determination unit 120 makes the i-th point $(X_i, Y_i, Z_i)$ belong to a cluster $C_N$ (Step S142b). Then, the stop determination unit 120 determines whether i=m is satisfied, i.e., whether data to be processed is the last data or not (Step S142c). When i=m is not satisfied (NO in Step S142c), the stop determination unit 120 determines whether the distance between a point $(X_i, Y_i, Z_i)$ and an adjacent point $(X_{i+1}, Y_{i+1}, Z_{i+1})$ is within THc or not (Step S142d). When the distance between the point $(X_i, Y_i, Z_i)$ and the point $(X_{i+1}, Y_{i+1}, Z_{i+1})$ is within THc (YES in Step S142d), the stop determination unit 120 makes the point $(X_{i+1}, Y_{i+1}, Z_{i+1})$ belong to the same cluster $C_N$ as the i-th point (Step S142e). Then, the stop determination unit 120 increments the value of i by one (Step S142f), and then returns the processing to S142c and repeats the processing of S142c to S142f.

On the other hand, when the distance between the point $(X_i, Y_i, Z_i)$ and the point $(X_{i+1}, Y_{i+1}, Z_{i+1})$ is not within THc (NO in Step S142d), the stop determination unit 120 determines that the point $(X_{i+1}, Y_{i+1}, Z_{i+1})$ belongs to a different cluster from the point $(X_i, Y_i, Z_i)$. Thus, the stop determination unit 120 increments the value of N by one (Step S142g) and further increments the value of i by one (Step S142h), and then the process returns to S142b. The point $(X_{i+1}, Y_{i+1}, Z_{i+1})$ thereby belongs to a different cluster from the point $(X_i, Y_i, Z_i)$ when the distance between the point $(X_i, Y_i, Z_i)$ and the point $(X_{i+1}, Y_{i+1}, Z_{i+1})$ is not within THc. Then, the determination unit 120 repeats the processing of S142b to S142f. Then, when i=m is satisfied, i.e., when data to be processed is the last data (YES in S142c), the stop determination unit 120 ends the processing of S142.

As shown by the arrow A1 in FIG. 12, the entry sensor 20 scans laser light in the positive direction of the Y-axis at the position of X=Xs at time t1. It is assumed that three fingers of the hand 92 are located in the irradiation area 22. In this case, the number N of clusters is N(t1)=3.

Then, the stop determination unit 120 performs the processing of S140 to S144 for time t2, and calculates the number N(t2) of clusters (Step S144). As shown by the arrow A2 in FIG. 12, when the hand 92 moves as indicated by the arrow A, the entry sensor 20 scans laser light in the positive direction of the Y-axis at the position of X=Xs at time t2. It is assumed that five fingers of the hand 92 are located in the irradiation area 22. In this case, the number N of clusters is N(t2)=5.

After that, the stop determination unit 120 determines whether a difference between the number N(t1) of clusters at time t1 and the number N(t2) of clusters at time t2 is less than a predetermined threshold Th4 or not (Step S146). Specifically, the stop determination unit 120 determines whether |N(t1)−N(t2)|<Th4 is satisfied or not. Th4 corresponds to ThA shown in FIG. 4. When Th4=1, N(t1) and N(t2) are equal.

When it is determined that |N(t1)−N(t2)|≥Th4 is satisfied (NO in S146), the stop determination unit 120 determines that the object 90 that has entered the irradiation area 22 is moving (Step S148). Thus, the stop determination unit 120 determines that the object 90 that has entered the irradiation area 22 is moving when a difference between the number N(t1) at time t1 and the number N(t2) at time t2 is equal to or more than the threshold Th4. On the other hand, when it is determined that |N(t1)−N(t2)|<Th4 is satisfied (YES in S146), the stop determination unit 120 determines that the object 90 that has entered the irradiation area 22 is stopping (Step S149). Thus, the stop determination unit 120 determines that the object 90 that has entered the irradiation area 22 is stopping when a difference between the number N(t1) at time t1 and the number N(t2) at time t2 is less than the threshold Th4.

The object 90 such as the hand 92 is not in one group (lump), and the number of groups (lumps) in the irradiation area 22 varies depending on the position to pass the irradiation area 22. Thus, when the hand 92 moves across the irradiation area 22 from time t1 to time t2, the number (N(t1)) of clusters in the irradiation area 22 at time t1 and the number (N(t2)) of clusters in the irradiation area 22 at time t2 can be different from each other. It is therefore possible to determine whether the object 90 has stopped or not by using a difference between the number of clusters in the irradiation area 22 at time t1 and the number of clusters in the irradiation area 22 at time t2.

Figure 13:
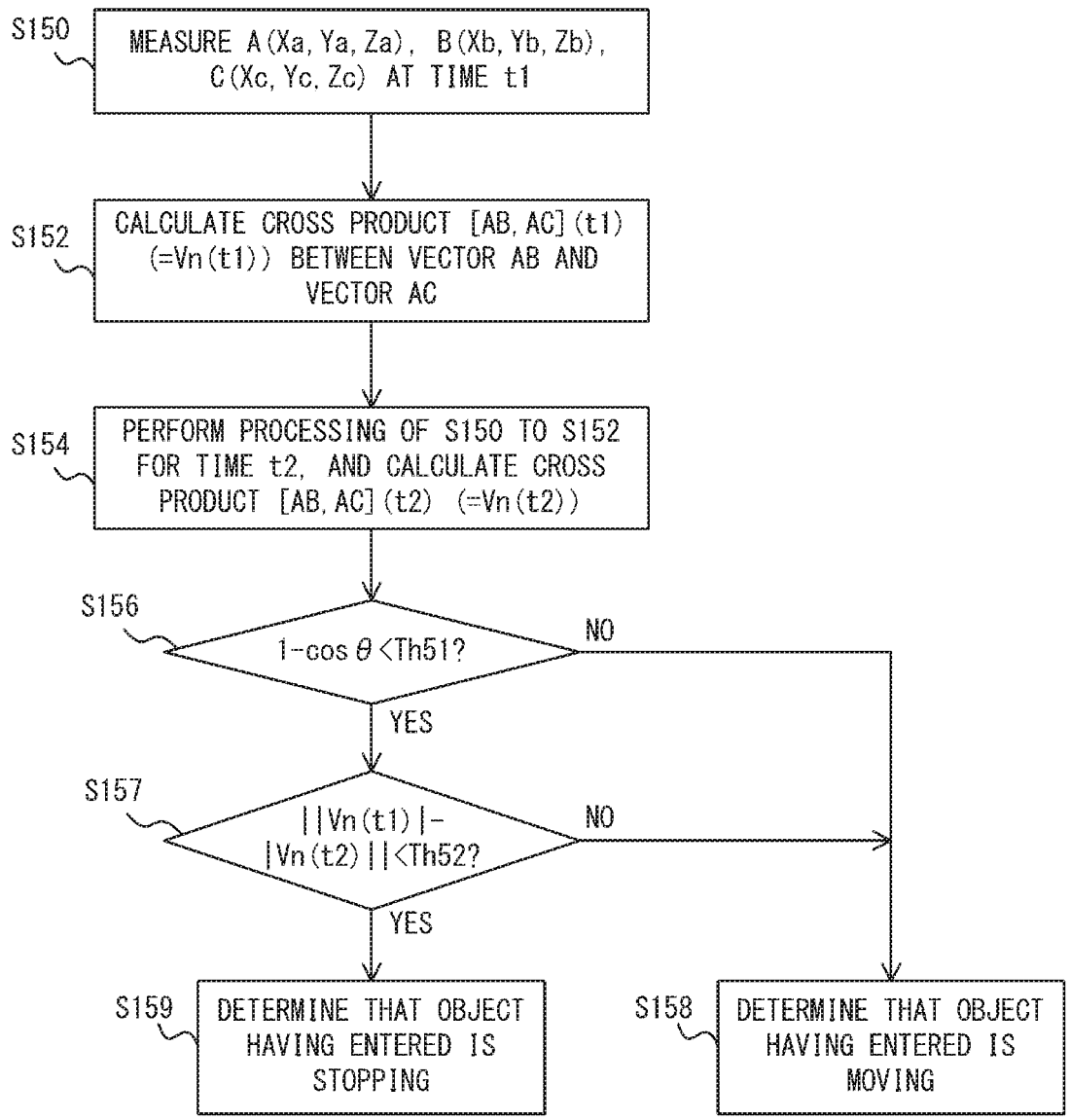
FIG. 13 is a flowchart showing a method of determining whether an object has stopped in a fifth example.
Figure 14:
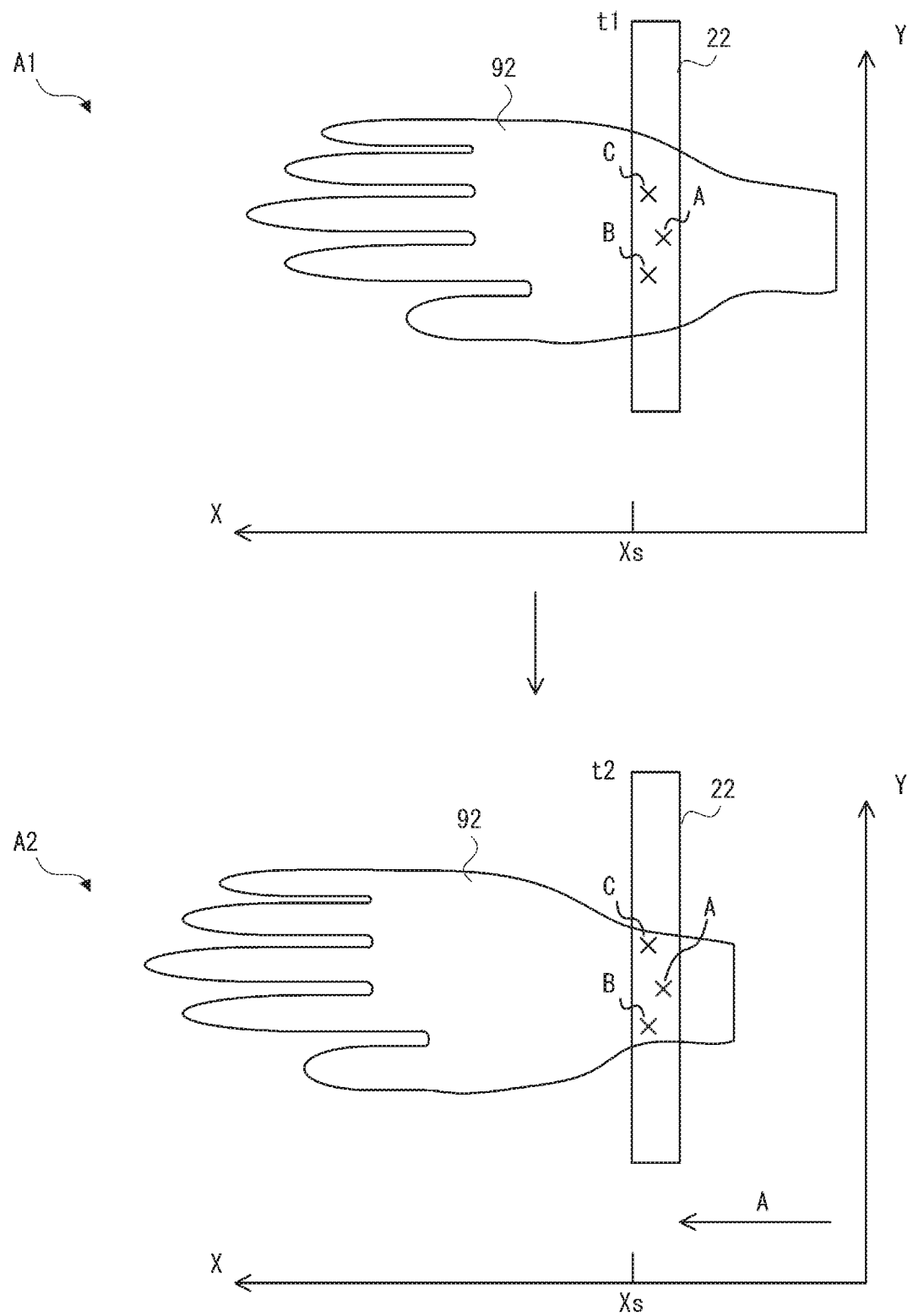
FIG. 14 is a view illustrating the fifth example.

FIG. 13 is a flowchart showing a method of determining whether the object 90 has stopped in the fifth example. FIG. 14 is a view illustrating the fifth example. In the fifth example, the feature data corresponds to the normal vector of the object 90 in the irradiation area 22. Note that, in the fifth example, the irradiation area 22 is not planar, and it has a width in the X-axis direction.

The feature extraction unit 110 extracts data at three measurement points A(Xa, Ya, Za), B(Xb, Yb, Zb), and C(Xc, Yc, Zc) at time t1 as shown by the arrow A1 in FIG. 14 (Step S150). Each of the measurement points A, B and C may be a point measured by laser light that is emitted in a predetermined direction from the entry sensor 20.

Next, the stop determination unit 120 calculates the cross product [AB,AC](t1) (cross product vector) between the vector AB and the vector AC (Step S152). The cross product [AB,AC](t1) corresponds to the normal vector Vn(t1) of the hand 92 in the irradiation area 22 at time t1. When the X, Y, Z components of the cross product [AB,AC](t1) are (a, b, c), the cross product [AB,AC](t1) is calculated geometrically as below.

$$a=(Yb-Ya)*(Zc-Za)-(Yc-Ya)*(Zb-Za)$$

$$b=(Zb-Za)*(Xc-Xa)-(Zc-Za)*(Xb-Xa)$$

$$c=(Xb-Xa)*(Yc-Ya)-(Xc-Xa)*(Yb-Ya)$$

Then, the stop determination unit 120 performs the processing of S150 to S152 for time t2, and calculates the cross product [AB,AC](t2) (cross product vector) (Step S154). Specifically, the feature extraction unit 110 extracts data at three measurement points A(Xa, Ya, Za), B(Xb, Yb, Zb), and C(Xc, Yc, Zc) at time t2 as shown by the arrow A2 in FIG. 14. The stop determination unit 120 then calculates the cross product [AB,AC](t2) between the vector AB and the vector AC. The cross product [AB,AC](t2) corresponds to the normal vector Vn(t2) of the hand 92 in the irradiation area 22 at time t2.

The stop determination unit 120 calculates an angle θ between the normal vector Vn(t1) (i.e., the cross product [AB,AC](t1)) and the normal vector Vn(t2) (i.e., the cross product [AB,AC](t2)), and determines whether 1−cos θ<Th51 is satisfied or not (Step S156). Note that Th51 is a predetermined threshold, which corresponds to ThA shown in FIG. 4. Further, cos θ can be calculated by the inner product between the normal vector Vn(t1) and the normal vector Vn(t2). When 1−cos θ≥Th51 is satisfied (NO in S156), a difference in direction between the normal vector Vn(t1) and the normal vector Vn(t2) is large, and the stop determination unit 120 determines that the object 90 that has entered the irradiation area 22 is moving (Step S158).

On the other hand, when 1−cos θ<Th51 is satisfied (YES in S156), a difference in direction between the normal vector Vn(t1) and the normal vector Vn(t2) is small. In this case, the stop determination unit 120 determines whether a difference between the size |Vn(t1)| of the normal vector Vn(t1) and the size |Vn(t2)| of the normal vector Vn(t2) is less than a predetermined threshold Th52 or not (Step S157). Specifically, the stop determination unit 120 determines whether |||Vn(t1)|−|Vn(t2)|μ<Th52 is satisfied or not. Th52 corresponds to ThA shown in FIG. 4.

When it is determined that |||Vn(t1)|−|Vn(t2)|||≥Th52 is satisfied (NO in S157), the stop determination unit 120 determines that the object 90 that has entered the irradiation area 22 is moving (Step S158). Thus, the stop determination unit 120 determines that the object 90 that has entered the irradiation area 22 is moving when a difference between the size |Vn(t1)| of the normal vector at time t1 and the size |Vn(t2)| of the normal vector at time t2 is equal to or more than the threshold Th52. On the other hand, when it is determined that |||Vn(t1)|−|Vn(t2)|||<Th52 is satisfied (YES in S157), the stop determination unit 120 determines that the object 90 that has entered the irradiation area 22 is stopping (Step S159). Thus, the stop determination unit 120 determines that the object 90 that has entered the irradiation area 22 is stopping when a difference between the size |Vn(t1)| of the normal vector and the size |Vn(t2)| of the normal vector at time t2 is less than the threshold Th52.

The surface shape of the hand 92 is irregular, and the orientation of the surface is not uniform due to joints or the like. Thus, when the hand 92 moves across the irradiation area 22 from time t1 to time t2, the normal vector Vn(t1) of the hand 92 in the irradiation area 22 at time t1 and the normal vector Vn(t2) of the hand 92 in the irradiation area 22 at time t2 can be different from each other. For example, the normal vector can significantly different between the case where the irradiation area 22 corresponds to the dorsal surface (back) of the hand 92 as shown by the arrow A1 in FIG. 14 and the case where the irradiation area 22 corresponds to the wrist as shown by the arrow A2 in FIG. 14. It is therefore possible to determine whether the object 90 has stopped or not by using a difference between the normal vector in the irradiation area 22 at time t1 and the normal vector in the irradiation area 22 at time t2 (a difference in each of the direction and the size of the normal vectors). Note that the size of the normal vector may be normalized when calculating the size of the normal vectors (S157).

In the fifth example, a difference between the normal vector of the object 90 in the irradiation area 22 at time t1 and the normal vector of the object 90 in the irradiation area 22 at time t2 is the variation of the feature of the object 90. Since the normal vector is uniquely defined if a plane is determined, it appropriately represents the surface shape of the object 90. Thus, the method according to the fifth example enables more appropriate calculation of the variation of the feature of the object 90.

Second Example Embodiment

A second example embodiment is described hereinafter. The second example embodiment is different from the first example embodiment in that a plurality of shape sensors 40 are provided. Note that the elements in the second example embodiment that are substantially the same as the elements in the first example embodiment are denoted by the same reference symbols. Further, the description of the elements that are substantially the same as the elements in the first example embodiment is omitted as appropriate.

Figure 15:
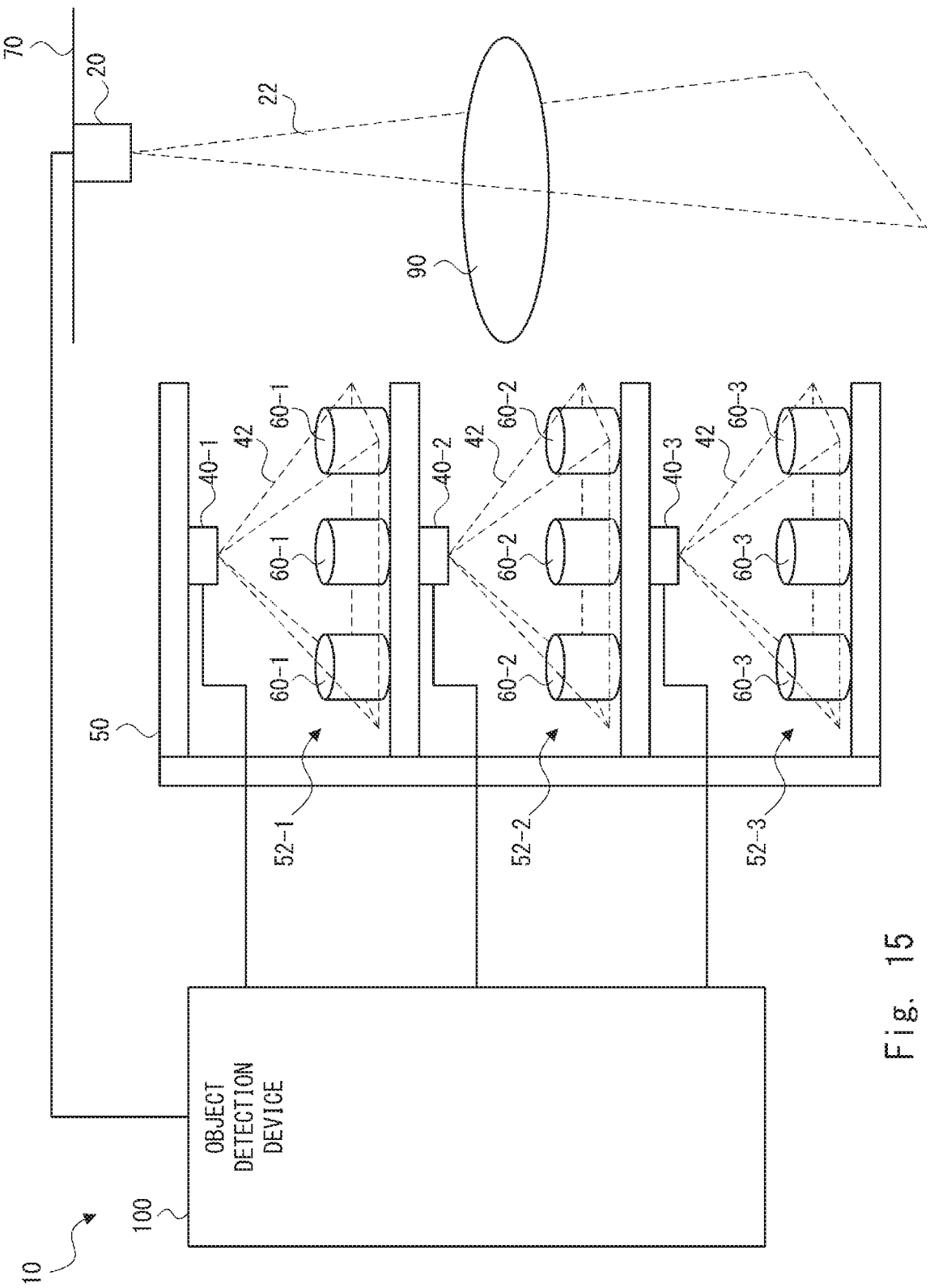
FIG. 15 is a view showing the configuration of an object detection system according to a second example embodiment.

FIG. 15 is a view showing the configuration of an object detection system 10 according to the second example embodiment. The object detection system 10 according to the second example embodiment includes an entry sensor 20, a plurality of shape sensors 40, and an object detection device 100. The functions of the entry sensor 20 and the shape sensor 40 according to the second example embodiment are substantially the same as those according to the first example embodiment. Further, the hardware configuration of the object detection device 100 according to the second example embodiment is substantially the same as that according to the first example embodiment.

The shape sensor 40 is mounted on a store shelf 50 on which a plurality of products 60 are displayed. The store shelf 50 includes a plurality of shelves 52-1, 52-2, and 52-3. One or more products 60-1 are displayed on the shelf 52-1. One or more products 60-2 are displayed on the shelf 52-2. One or more products 60-3 are displayed on the shelf 52-3. A shape sensor 40-1 is mounted on the shelf 52-1. A shape sensor 40-2 is mounted on the shelf 52-2. A shape sensor 40-3 is mounted on the shelf 52-3.

The entry sensor 20 is mounted on a ceiling 70, for example. When the object 90 (for example, the arm of a customer which is extended to the store shelf 50) has passed the irradiation area 22 and entered on the side of the store shelf 50, the entry sensor 20 detects the three-dimensional coordinates (X, Y, Z) of a position on the surface of the object 90 which is irradiated with laser light in the irradiation area 22. The shape sensor 40-1 is capable of detecting the shape of the object 90 that has passed the irradiation area 22 and entered the shelf 52-1. The shape sensor 40-2 is capable of detecting the shape of the object 90 that has passed the irradiation area 22 and entered the shelf 52-2. The shape sensor 40-3 is capable of detecting the shape of the object 90 that has passed the irradiation area 22 and entered the shelf 52-3.

Figure 16:
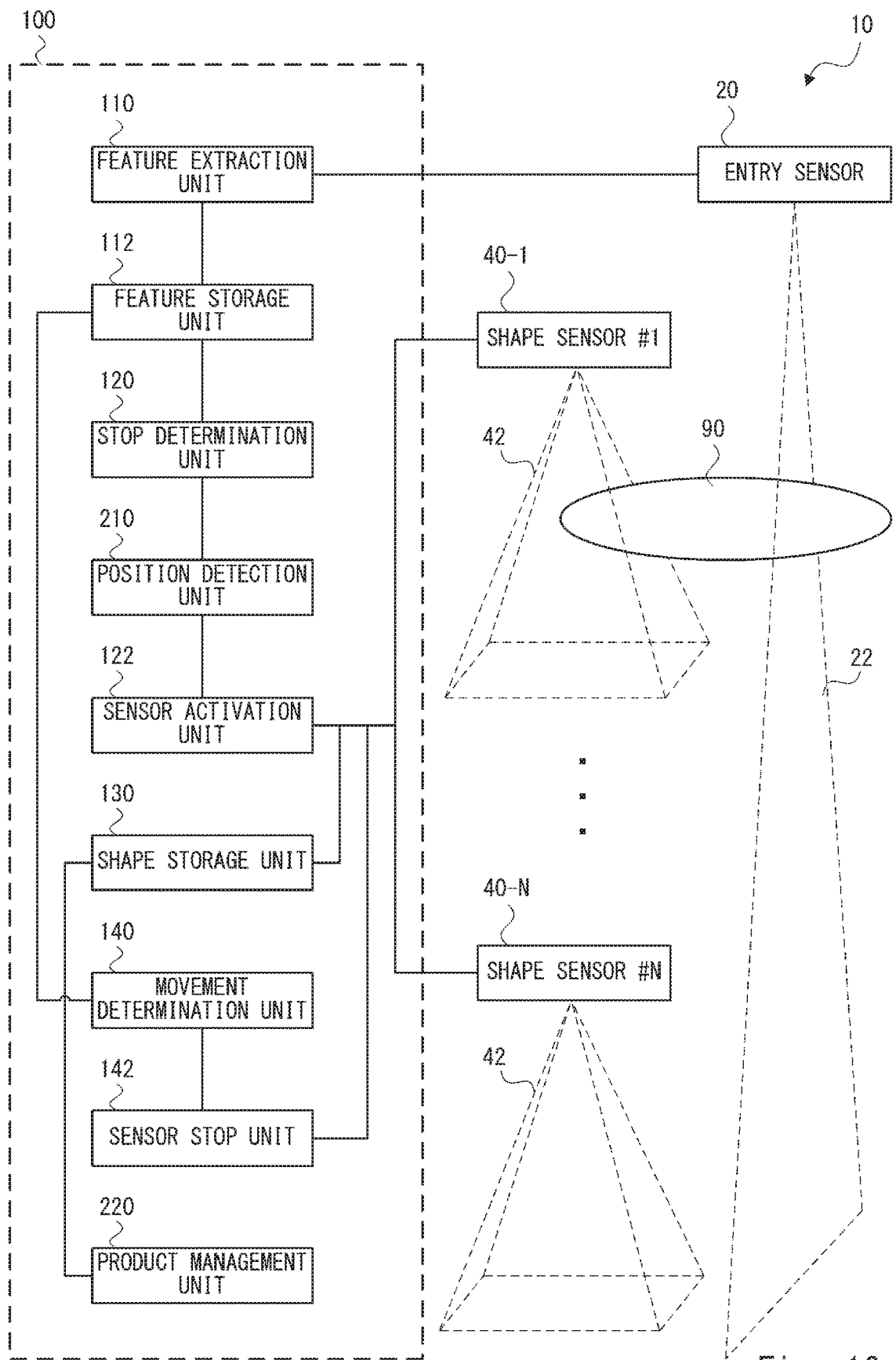
FIG. 16 is a functional block diagram showing the object detection system according to the second example embodiment.

FIG. 16 is a functional block diagram showing the object detection system 10 according to the second example embodiment. The object detection device 100 according to the second example embodiment includes a feature extraction unit 110, a feature storage unit 112, a stop determination unit 120, a sensor activation unit 122, a shape storage unit 130, a movement determination unit 140, and a sensor stop unit 142.

Further, the object detection device 100 according to the second example embodiment includes a position detection unit 210 and a product management unit 220. The position detection unit 210 and the product management unit 220 function as a position detection means and a product management means, respectively.

The position detection unit 210 detects a position where the object 90 passes in the irradiation area 22 of the entry sensor 20. The sensor activation unit 122 activates the shape sensor 40 corresponding to the position detected by the position detection unit 210 among the shape sensors 40-1 to 40-N. N is an integer of 2 or more. The product management unit 220 performs management related to the products 60 displayed on the store shelf 50. This is described in detail later.

Figure 17:
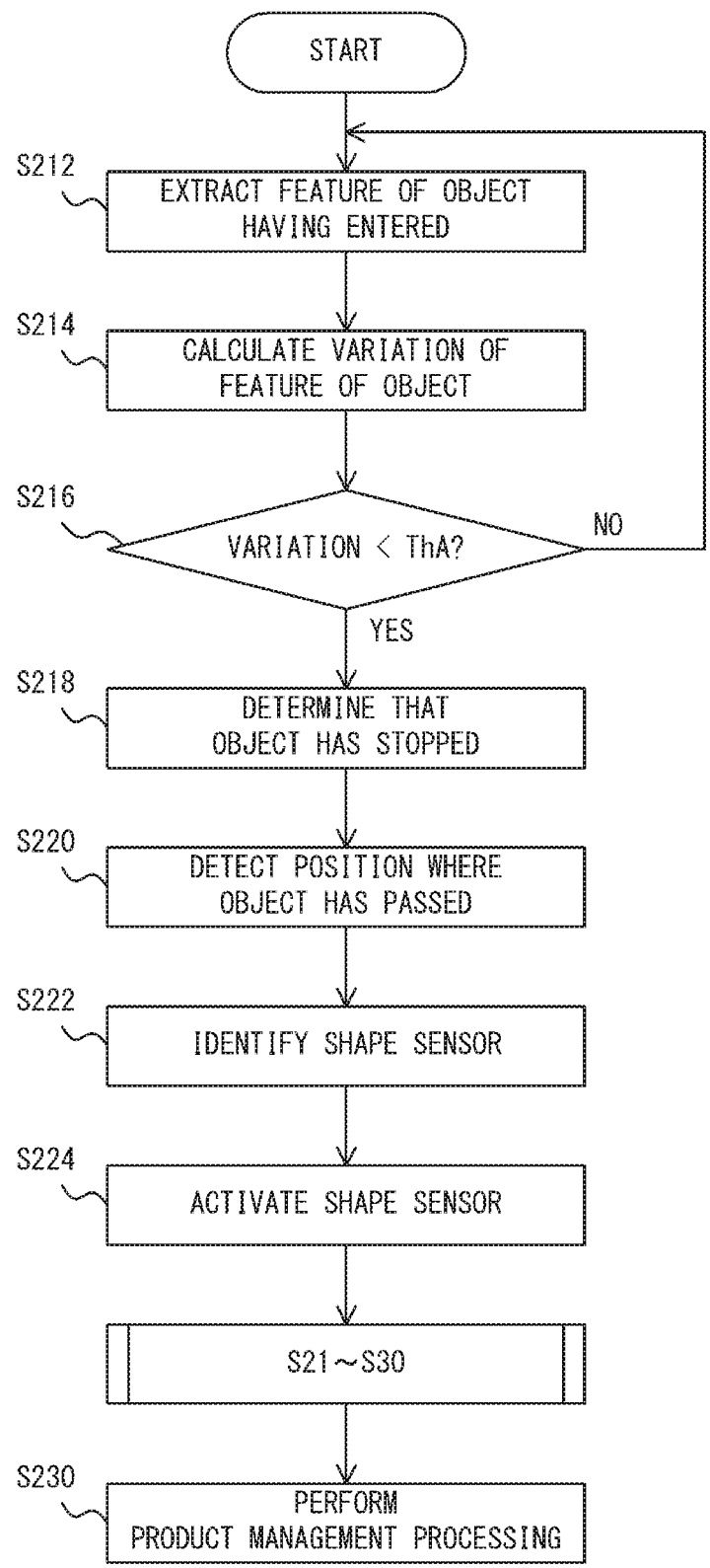
FIG. 17 is a flowchart showing an object detection method performed by an object detection device according to the second example embodiment.

FIG. 17 is a flowchart showing an object detection method performed by the object detection device 100 according to the second example embodiment. The feature extraction unit 110 extracts feature data indicating the feature of the object 90 that has passed the irradiation area 22 of the entry sensor 20 and entered on the side of the shape sensor 40 in the same manner as in S12 shown in FIG. 4 (Step S212). The feature extraction unit 110 then stores the extracted feature data, in association with time when the feature data is extracted, into the feature storage unit 112.

The stop determination unit 120 calculates the variation of the feature of the object 90 having passed the irradiation area 22 in the same manner as in S14 shown in FIG. 4 (Step S214). Then, the stop determination unit 120 determines whether the variation of the feature data falls below a predetermined threshold ThA or not in the same manner as in S16 shown in FIG. 4 (Step S216). When it is determined that the variation is equal to or more than the threshold ThA (NO in S216), the process returns to S212. In this case, since the feature data varies, the stop determination unit 120 determines that the object 90 is not stopping. On the other hand, when it is determined that the variation is less than the threshold ThA (YES in S216), the feature data does not vary, and the stop determination unit 120 determines that the object 90 has stopped in the same manner as in S18 shown in FIG. 4 (Step S218).

The position detection unit 210 detects a position in the irradiation area 22 when the object 90 passes the irradiation area 22 (Step S220). To be specific, the position detection unit 210 detects a position of the object 90 in the irradiation area 22 from a group of coordinate data in the irradiation area 22 when the object 90 passes the irradiation area 22. For example, the position detection unit 210 may calculate the center of mass (i.e., median point) of the coordinate data group of the object 90 in the irradiation area 22.

Then, the position detection unit 210 identifies the shape sensor 40 corresponding to the detected position (Step S222). To be specific, the position detection unit 210 identifies the shelf 52 that is located opposite to the position detected in the processing of S220. The position detection unit 210 then identifies the shape sensor 40 that is mounted on the identified shelf 52. For example, when the object 90 passes the irradiation area 22 at the position opposite to the shelf 52-1, the position detection unit 210 identifies the shape sensor 40-1. When the object 90 passes the irradiation area 22 at the position opposite to the shelf 52-2, the position detection unit 210 identifies the shape sensor 40-2. When the object 90 passes the irradiation area 22 at the position opposite to the shelf 52-3, the position detection unit 210 identifies the shape sensor 40-3. Note that the position detection unit 210 may store each shelf 52 and position information indicating the position opposite to each shelf 52 in the irradiation area 22 in association with each other in advance.

The sensor activation unit 122 activates the shape sensor 40 identified by the processing of S222 (Step S224). In other words, the sensor activation unit 122 activates the shape sensor 40 corresponding to the position in the irradiation area 22 where the object 90 has passed when the variation of the feature data falls below the threshold ThA. The shape sensor 40 that is mounted on the shelf 52 located in the direction in which the object 90 is moving is thereby activated and starts detecting the shape of the object 90 in the irradiation area 42.

After that, the processing of S21 to S30 shown in FIG. 4 is performed. Then, the product management unit 220 performs product management processing (Step S230). To be specific, the product management unit 220 determines which of the product 60 has been taken from the store shelf 50 from the information stored in the shape storage unit 130. Further, the product management unit 220 determines how the shape of the object 90 has changed from the information stored in the shape storage unit 130. For example, when the object 90 is the arm of a customer which is extended to the store shelf 50, the product management unit 220 determines a change in the shape of the hand which occurs as the hand is trying to grab the product 60. For example, the product management unit 220 determines whether the hand has tried to grab the product 60 but not grabbed it, the hand has grabbed the product 60 and released it, or the hand has grabbed the product 60 and taken it from the shelf 52. The product management unit 220 thereby determines what impression each product 60 displayed on the store shelf 50 has made on customers. Further, the product management unit 220 may record in which time period customers have performed the above action. Thus, the product management unit 220 can do marketing of the product 60.

Further, when the hand of a customer grabs the product 60 and takes it from the shelf 52, the product management unit 220 may perform payment processing of the product 60 taken. The product management unit 220 can thereby perform payment and stock control of the products 60 displayed on the store shelf 50. Further, when the hand of a customer grabs the product 60 and takes it from the shelf 52, the product management unit 220 may determine whether the customer has made a payment for this product 60 at the place of payment (checkout; cash register) located at a different place from the store shelf 50. Thus, when the hand of a customer has grabbed the product 60 and taken it from the shelf 52 but the customer has not made a payment for this product 60, the product management unit 220 can determine that there is a possibility that this customer has stolen this product 60.

The object detection device 100 according to the second example embodiment activates the shape sensor 40 corresponding to the position in the irradiation area 22 where the object 90 has passed among the plurality of shape sensors 40. This allows activation of only the shape sensor 40 that needs to be activated without activating all of the plurality of shape sensors 40. Further, when the shape sensor 40 is mounted on the store shelf 50, the object detection device 100 according to the second example embodiment can perform product management based on information about the shape of the object 90 detected by the shape sensor 40.

Modified Example

It should be noted that the present invention is not restricted to the above-described example embodiments, and various changes and modifications may be made without departing from the scope of the invention. For example, the order of process steps in the flowcharts shown in FIG. 4 and so on may be altered as appropriate. Further, one or more process steps in the flowcharts shown in FIG. 4 and so on may be omitted. For example, S22 to S30 in FIG. 4 may be omitted.

Further, although the entry sensor 20 emits laser light in the downward direction from above the object 90 in the above-described example embodiments, the present invention is not limited to this structure. The direction of emitting laser light from the entry sensor 20 is not limited to downward, and it is arbitrary. Further, although the number of the entry sensor 20 is one in the above-described example embodiments, the present invention is not limited to this structure. A plurality of entry sensors 20 may be provided. When a plurality of entry sensors 20 are provided, laser light may be applied both from above and below the object 90 to enable detection of not only the upper shape of the object 90 but also the lower shape of the object 90.

Further, although the entry sensor 20 and the shape sensor 40 are three-dimensional sensors in the above-described example embodiments, the present invention is not limited to this structure. At least one of the entry sensor 20 and the shape sensor 40 may be a two-dimensional sensor. However, if the entry sensor 20 and the shape sensor 40 are two-dimensional sensors, it is necessary to perform complicated image processing such as image recognition in order to detect the shape of the object 90. Further, use of a three-dimensional sensor enables accurate detection of the three-dimensional shape of the object 90 compared with use of a two-dimensional sensor. Thus, use of a three-dimensional sensor enables easy and accurate detection of the shape of the object 90.

Further, although FIG. 15 shows the store shelf 50 including three shelves 52, the number of shelves 52 in the store shelf 50 may be arbitrary. Accordingly, the number of the shape sensors 40 may be also arbitrary. Further, the number of the shape sensors 40 does not necessarily depend on the number of shelves in the store shelf 50. Furthermore, although product management is performed when a plurality of shape sensors 40 are provided as in the second example embodiment in the above-described example embodiments, the present invention is not limited to this structure. Product management may be performed also when one shape sensor 40 is mounted on the store shelf 50.

In the above-described example, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

An object detection device comprising:

a feature extraction means for extracting a feature of an object in an irradiation area of irradiation light from a first sensor when the object passes the irradiation area, the first sensor being configured to detect a feature of a part of surface of the object by applying irradiation light; and a sensor activation means for activating a second sensor when variation of the extracted feature falls below a predetermined first threshold, the second sensor being configured to detect an object shape.

(Supplementary Note 2)

The object detection device according to Supplementary Note 1, further comprising:

a stop determination means for determining that the object has stopped moving when variation of the extracted feature falls below a predetermined threshold, wherein the sensor activation means activates the second sensor when the stop determination means determines that the object has stopped moving.

(Supplementary Note 3)

The object detection device according to Supplementary Note 1 or 2, further comprising:

a movement determination means for determining whether the object has started moving based on the extracted feature of the object; and a sensor stop means for stopping operation of the second sensor when the movement determination means determines that the object has started moving after the second sensor is activated.

(Supplementary Note 4)

The object detection device according to Supplementary Note 3, wherein the movement determination means determines that the object has started moving when variation of the extracted feature of the object exceeds a predetermined second threshold.

(Supplementary Note 5)

The object detection device according to any one of Supplementary Notes 1 to 4, wherein a plurality of second sensors are provided, the object detection device further comprises a position detection means for detecting a position where the object has passed an irradiation area of the first sensor, and the sensor activation means activates the second sensor corresponding to the detected position among the plurality of second sensors when variation of the extracted feature falls below the first threshold.

(Supplementary Note 6)

The object detection device according to any one of Supplementary Notes 1 to 5, wherein the first sensor is a three-dimensional sensor, and the extracted feature relates to a shape of the object.

(Supplementary Note 7)

The object detection device according to Supplementary Note 6, wherein the extracted feature corresponds to the number of data indicating each position of the object in the irradiation area of the first sensor, and the sensor activation means activates the second sensor when variation of the number of data falls below the first threshold.

(Supplementary Note 8)

The object detection device according to Supplementary Note 6, wherein the extracted feature corresponds to coordinate data indicating each position of the object in the irradiation area of the first sensor, and the sensor activation means activates the second sensor when variation of the coordinate data falls below the first threshold.

(Supplementary Note 9)

The object detection device according to Supplementary Note 6, wherein the extracted feature corresponds to a size of the object in the irradiation area of the first sensor, and the sensor activation means activates the second sensor when variation of the size of the object falls below the first threshold.

(Supplementary Note 10)

The object detection device according to Supplementary Note 6, wherein the extracted feature corresponds to a normal vector of the object in the irradiation area of the first sensor, and the sensor activation means activates the second sensor when variation of the normal vector of the object falls below the first threshold.

(Supplementary Note 11)

the object detection device according to any one of Supplementary Notes 1 to 10, further comprising:

a product management means for performing product management based on a shape of the object detected by the second sensor.

(Supplementary Note 12)

An object detection system comprising:

a first sensor configured to detect a feature of a part of surface of an object by applying irradiation light:

a second sensor configured to detect an object shape; and the object detection device according to any one of Supplementary Notes 1 to 11.

(Supplementary Note 13)

An object detection method comprising:

extracting a feature of an object in an irradiation area of irradiation light from a first sensor when the object passes the irradiation area, the first sensor being configured to detect a feature of a part of surface of the object by applying irradiation light; and activating a second sensor when variation of the extracted feature falls below a predetermined first threshold, the second sensor being configured to detect an object shape.

(Supplementary Note 14)

The object detection method according to Supplementary Note 13, wherein it is determined that the object has stopped moving when variation of the extracted feature falls below a predetermined threshold, and the second sensor is activated when it is determined that the object has stopped moving.

(Supplementary Note 15)

The object detection method according to Supplementary Note 13 or 14, wherein it is determined whether the object has started moving based on the extracted feature of the object; and operation of the second sensor is stopped when it is determined that the object has started moving after the second sensor is activated.

(Supplementary Note 16)

The object detection method according to Supplementary Note 15, wherein it is determined that the object has started moving when variation of the extracted feature of the object exceeds a predetermined second threshold.

(Supplementary Note 17)

The object detection method according to any one of Supplementary Notes 13 to 16, wherein a plurality of second sensors are provided, a position where the object has passed an irradiation area of the first sensor is detected, and the second sensor corresponding to the detected position is activated among the plurality of second sensors when variation of the extracted feature falls below the first threshold.

(Supplementary Note 18)

The object detection method according to any one of Supplementary Notes 13 to 17, wherein the first sensor is a three-dimensional sensor, and the extracted feature relates to a shape of the object.

(Supplementary Note 19)

The object detection method according to Supplementary Note 18, wherein the extracted feature corresponds to the number of data indicating each position of the object in the irradiation area of the first sensor, and the second sensor is activated when variation of the number of data falls below the first threshold.

(Supplementary Note 20)

The object detection method according to Supplementary Note 18, wherein the extracted feature corresponds to coordinate data indicating each position of the object in the irradiation area of the first sensor, and the second sensor is activated when variation of the coordinate data falls below the first threshold.

(Supplementary Note 21)

The object detection method according to Supplementary Note 18, wherein the extracted feature corresponds to a size of the object in the irradiation area of the first sensor, and the second sensor is activated when variation of the size of the object falls below the first threshold.

(Supplementary Note 22)

The object detection method according to Supplementary Note 18, wherein the extracted feature corresponds to a normal vector of the object in the irradiation area of the first sensor, and the second sensor is activated when variation of the normal vector of the object falls below the first threshold.

(Supplementary Note 23)

The object detection method according to any one of Supplementary Notes 13 to 22, wherein product management is performed based on a shape of the object detected by the second sensor.

(Supplementary Note 24)

A non-transitory computer-readable medium storing a program causing a computer to perform:

a step of extracting a feature of an object in an irradiation area of irradiation light from a first sensor when the object passes the irradiation area, the first sensor being configured to detect a feature of a part of surface of the object by applying irradiation light; and a step of activating a second sensor when variation of the extracted feature falls below a predetermined first threshold, the second sensor being configured to detect an object shape.

REFERENCE SIGNS LIST

1 OBJECT DETECTION DEVICE
2 FEATURE EXTRACTION UNIT
4 SENSOR ACTIVATION UNIT
10 OBJECT DETECTION SYSTEM
20 ENTRY SENSOR
22 IRRADIATION AREA
24 SHAPE SENSOR
42 IRRADIATION AREA
100 OBJECT DETECTION DEVICE
110 FEATURE EXTRACTION UNIT
112 FEATURE STORAGE UNIT
120 STOP DETERMINATION UNIT
122 SENSOR ACTIVATION UNIT
130 SHAPE STORAGE UNIT
140 MOVEMENT DETERMINATION UNIT
142 SENSOR STOP UNIT
210 POSITION DETECTION UNIT
220 PRODUCT MANAGEMENT UNIT

The invention claimed is:

1. An object detection device comprising:
   hardware, including a processor and memory;
   a feature extraction unit implemented at least by the hardware and configured to extract a feature of an object in an irradiation area of irradiation light from a first sensor when the object passes the irradiation area, the first sensor being configured to detect a feature of a part of surface of the object by applying irradiation light; and
   a sensor activation unit implemented at least by the hardware and configured to activate a second sensor when variation of the extracted feature falls below a predetermined first threshold, the second sensor being configured to detect an object shape.

2. The object detection device according to claim 1, further comprising:
   a stop determination unit implemented at least by the hardware and configured to determine that the object has stopped moving when variation of the extracted feature falls below a predetermined threshold, wherein
   the sensor activation unit activates the second sensor when the stop determination unit determines that the object has stopped moving.

3. The object detection device according to claim 1, further comprising:
   a movement determination unit implemented at least by the hardware and configured to determine whether the object has started moving based on the extracted feature of the object; and
   a sensor stop unit implemented at least by the hardware and configured to stop operation of the second sensor when the movement determination unit determines that the object has started moving after the second sensor is activated.

4. The object detection device according to claim 3, wherein the movement determination unit determines that the object has started moving when variation of the extracted feature of the object exceeds a predetermined second threshold.

5. The object detection device according to claim 1, wherein
a plurality of second sensors are provided,
the object detection device further comprises a position detection unit implemented at least by the hardware and configured to detect a position where the object has passed an irradiation area of the first sensor, and
the sensor activation unit activates the second sensor corresponding to the detected position among the plurality of second sensors when variation of the extracted feature falls below the first threshold.

6. The object detection device according to claim 1, wherein
the first sensor is a three-dimensional sensor, and
the extracted feature relates to a shape of the object.

7. The object detection device according to claim 6, wherein
the extracted feature corresponds to the number of data indicating each position of the object in the irradiation area of the first sensor, and
the sensor activation unit activates the second sensor when variation of the number of data falls below the first threshold.

8. The object detection device according to claim 6, wherein
the extracted feature corresponds to coordinate data indicating each position of the object in the irradiation area of the first sensor, and
the sensor activation unit activates the second sensor when variation of the coordinate data falls below the first threshold.

9. The object detection device according to claim 6, wherein
the extracted feature corresponds to a size of the object in the irradiation area of the first sensor, and
the sensor activation unit activates the second sensor when variation of the size of the object falls below the first threshold.

10. The object detection device according to claim 6, wherein
the extracted feature corresponds to a normal vector of the object in the irradiation area of the first sensor, and
the sensor activation unit activates the second sensor when variation of the normal vector of the object falls below the first threshold.

11. The object detection device according to claim 1, further comprising:
a product management unit implemented at least by the hardware and configured to perform product management based on a shape of the object detected by the second sensor.

12. An object detection system comprising:
a first sensor configured to detect a feature of a part of surface of an object by applying irradiation light;
a second sensor configured to detect an object shape; and
the object detection device according to claim 1.

13. An object detection method comprising:
extracting a feature of an object in an irradiation area of irradiation light from a first sensor when the object passes the irradiation area, the first sensor being configured to detect a feature of a part of surface of the object by applying irradiation light; and
activating a second sensor when variation of the extracted feature falls below a predetermined first threshold, the second sensor being configured to detect an object shape.

14. The object detection method according to claim 13, wherein
it is determined that the object has stopped moving when variation of the extracted feature falls below a predetermined threshold, and
the second sensor is activated when it is determined that the object has stopped moving.

15. The object detection method according to claim 13, wherein
it is determined whether the object has started moving based on the extracted feature of the object; and
operation of the second sensor is stopped when it is determined that the object has started moving after the second sensor is activated.

16. The object detection method according to claim 15, wherein it is determined that the object has started moving when variation of the extracted feature of the object exceeds a predetermined second threshold.

17. The object detection method according to claim 13, wherein
a plurality of second sensors are provided,
a position where the object has passed an irradiation area of the first sensor is detected, and
the second sensor corresponding to the detected position is activated among the plurality of second sensors when variation of the extracted feature falls below the first threshold.

18. The object detection method according to claim 13, wherein
the first sensor is a three-dimensional sensor, and
the extracted feature relates to a shape of the object.

19. The object detection method according to claim 18, wherein
the extracted feature corresponds to the number of data indicating each position of the object in the irradiation area of the first sensor, and
the second sensor is activated when variation of the number of data falls below the first threshold.

20. A non-transitory computer-readable medium storing a program causing a computer to perform:
a step of extracting a feature of an object in an irradiation area of irradiation light from a first sensor when the object passes the irradiation area, the first sensor being configured to detect a feature of a part of surface of the object by applying irradiation light; and
a step of activating a second sensor when variation of the extracted feature falls below a predetermined first threshold, the second sensor being configured to detect an object shape.

* * * * *